(12) United States Patent
Gugino

(10) Patent No.: US 11,113,508 B2
(45) Date of Patent: *Sep. 7, 2021

(54) PERSONAL PROTECTIVE EQUIPMENT FITTING DEVICE AND METHOD

(71) Applicant: The GMN Group LLC, Roseville, CA (US)

(72) Inventor: Michael Gugino, Roseville, CA (US)

(73) Assignee: THE GMN GROUP LLC, Roseville, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/658,973

(22) Filed: Oct. 21, 2019

(65) Prior Publication Data

US 2020/0050836 A1 Feb. 13, 2020

Related U.S. Application Data

(63) Continuation-in-part of application No. 16/444,733, filed on Jun. 18, 2019.

(Continued)

(51) Int. Cl.
| | | |
|---|---|---|
| *G06K 9/00* | (2006.01) | |
| *G06T 17/00* | (2006.01) | |
| *A62B 18/02* | (2006.01) | |

(52) U.S. Cl.
CPC .......... *G06K 9/00248* (2013.01); *A62B 18/02* (2013.01); *G06T 17/00* (2013.01)

(58) Field of Classification Search
CPC ...... G06K 9/00248; A62B 18/02; G06T 17/00
See application file for complete search history.

(56) References Cited

U.S. PATENT DOCUMENTS

| | | |
|---|---|---|
| 7,827,038 B2 | 11/2010 | Richard et al. |
| 10,061,888 B2 | 8/2018 | Wang et al. |

(Continued)

FOREIGN PATENT DOCUMENTS

| | | |
|---|---|---|
| KR | 10-2015-0076765 A | 7/2015 |
| WO | 2014150776 A1 | 9/2014 |

OTHER PUBLICATIONS

Patent Cooperation Treaty, International Search Report for PCTU/US2019/039402, dated Oct. 17, 2019, pp. 1-3.

(Continued)

*Primary Examiner* — Khai M Nguyen
(74) *Attorney, Agent, or Firm* — Pillsbury Winthrop Shaw Pittman LLP

(57) ABSTRACT

A system and method for performing automated respirator mask fit testing are described. An example embodiment is configured to obtain, with one or more processors, at least one three-dimensional facial image of an individual; convert the facial image to numerical data for analysis, the numerical data representative of facial features, facial dimensions, and/or facial locations on the face of the individual; determine, based on the numerical data, a head form category for the individual; determine, based on the head form category and the numerical data, a face volume for the individual; and generate a mask fit pass (or fail) indication responsive to the face volume satisfying (or not satisfying) face volume fit criteria for the head form category. The principles described herein may also be applied for other personal protective equipment such as industrial head protection, eye and face protection, hand protection, and clothing.

15 Claims, 17 Drawing Sheets

Related U.S. Application Data

(60) Provisional application No. 62/782,684, filed on Dec. 20, 2018, provisional application No. 62/733,290, filed on Sep. 19, 2018, provisional application No. 62/691,485, filed on Jun. 28, 2018.

(56) References Cited

U.S. PATENT DOCUMENTS

| | | |
|---|---|---|
| 2006/0023228 A1 | 2/2006 | Geng |
| 2006/0235877 A1* | 10/2006 | Richard ............... A61M 16/06 |
| 2008/0060652 A1 | 3/2008 | Selvarajan et al. |
| 2009/0153552 A1 | 6/2009 | Fidaleo et al. |
| 2010/0191124 A1 | 7/2010 | Prokoski |
| 2010/0199112 A1 | 7/2010 | Prokoski |
| 2014/0278319 A1* | 9/2014 | Thiruvengada .......... A62B 7/04 703/11 |
| 2014/0278320 A1* | 9/2014 | Wang ..................... G06F 30/20 703/11 |
| 2015/0040910 A1* | 2/2015 | Koehler ................. A62B 18/02 128/205.27 |
| 2015/0055140 A1 | 2/2015 | Deguilio |
| 2016/0162604 A1 | 6/2016 | Xiaoli et al. |
| 2016/0180587 A1 | 6/2016 | Bai et al. |
| 2017/0173371 A1* | 6/2017 | Truex ................... B29C 64/393 |

OTHER PUBLICATIONS

Patent Cooperation Treaty, International Search Report issued in PCT/US2020/056361, dated Feb. 2, 2021, pp. 1-4.
United States Patent and Trademark Office, Notice of Allowance issued in U.S. Appl. No. 16/444,733, filed Apr. 28, 2021.

* cited by examiner

| Measurement (mm) | Small | Medium | Large | Short/Wide | Long/Narrow |
|---|---|---|---|---|---|
| Bizygomatic Breadth | 131.1 | 136.4 | 150.1 | 141.2 | 137.2 |
| Interpupillary Distance | 59.5 | 63.3 | 68.2 | 63.1 | 59.8 |
| Nasal Root Breadth | 17.5 | 18.8 | 20.8 | 21.3 | 19.1 |
| Minimum Frontal Breadth | 98.2 | 108.1 | 118.4 | 107.3 | 99.4 |
| Morphological Nose Breadth | 31.9 | 34.3 | 43.3 | 36.1 | 35.9 |
| Nose Bridge Length | 42.4 | 42.4 | 47.4 | 39.6 | 49.9 |
| Anatomical Nose Breadth | 34.8 | 39.0 | 45.4 | 39.9 | 38.7 |
| Outer Canthal | 87.3 | 93.8 | 100.2 | 85.6 | 88.3 |
| Inner Canthal | 36.0 | 35.6 | 43.0 | 38.5 | 35.2 |
| Eye Apex to Ear (Vertical) | 5.9 | 8.7 | 6.3 | 6.3 | 4.4 |
| Eye Apex to Ear (Horizontal) | 82.9 | 93.3 | 96.5 | 96.9 | 101.8 |

PERSONAL PROTECTIVE EQUIPMENT FITTING DEVICE AND METHOD

RELATED PATENT APPLICATIONS

This patent application is a continuation in part of U.S. Utility patent application Ser. No. 16/444,733. Application Ser. No. 16/444,733 claims the benefit of U.S. Provisional Patent Application No. 62/691,485 filed on Jun. 28, 2018, entitled SYSTEM AND METHOD FOR AUTOMATED RESPIRATOR FIT TESTING BY COMPARING THREE-DIMENSIONAL (3D) IMAGES, U.S. Provisional Patent Application No. 62/733,290 filed on Sep. 19, 2018, entitled RESPIRATOR FITTING DEVICE AND METHOD, and U.S. Provisional Patent Application No. 62/782,684 filed on Dec. 20, 2018, entitled RESPIRATOR FITTING DEVICE AND METHOD, which are expressly incorporated herein by reference in their entireties.

COPYRIGHT

A portion of the disclosure of this patent document contains material that is subject to copyright protection. The copyright owner has no objection to the facsimile reproduction of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2019 Michael GUGINO, All Rights Reserved.

TECHNICAL FIELD

This patent application relates to computer-implemented software systems, image processing, image manipulation, and automated personal protective equipment fit testing according to one embodiment, and more specifically to a system and method for automated personal protective equipment fit testing based on three-dimensional (3D) images.

BACKGROUND

A respirator is a piece of personal protective equipment worn on the face which covers at least the nose and mouth, and is used to reduce the user's risk of inhaling hazardous airborne particles (including dust particles and infectious agents), gases or vapors. Types of respirators include particulate respirators, which filter out airborne particles; "gas masks," which filter out chemicals and gases; airline respirators, which use compressed air from a remote source; and self-contained breathing apparatus, which include their own air supply. Employers are mandated to ensure employees wear properly fitted respirators when their use can abate hazards related to atmospheric conditions. Common fit testing may include qualitative (subjective) fit testing, ambient aerosol fit testing using a condensation nuclei counter, and controlled negative pressure fit testing (which measures the volumetric leak rate of a face piece of a mask) to determine respirator fit, for example.

Problems with conventional methods of fit testing a respirator mask to an employee (for example, and/or other respirator users) include the cumbersome nature of the fit test itself, the extensive time it takes to perform the fit test, and a test's susceptibility to seemingly innocuous environmental conditions. Also, when an respirator user is required to wear more than one respirator for their job, a separate fit test will likely be performed for each respirator. In U.S. Pat. No. 10,061,888 (granted on Aug. 28, 2018), the applicant identified similar problems with the current respirator fit technology citing the same general lack of efficiency and practicality. The applicant identified a need for a new and improved system for predicting an optimal fit of a respirator to a facial area.

A Quantitative Fit Test (QNFT) measures the fit factor between the respirator mask and a respirator user (RU). This fit test can be as long as 15-20 minutes. The fit factor is the ratio of the airborne test agent concentration outside the respirator mask to the test agent concentration inside the respirator. It may also be the ratio of total airflow through the respirator (e.g., modeled by the fit test instrument) to the airflow through respirator mask face-seal leaks. Fit factors do not always indicate whether a particular respirator model and size will properly protect a particular face. Fit factors are arbitrarily agreed upon values created by respirator manufacturers and NIOSH. An unacceptable fit is indicated by a low fit factor value (procedures are more fully described in Fed/OSHA CFR 1910.134, Appendix A, Section C). QNFT machines are necessarily highly sensitive pieces of machinery. Seemingly insignificant environmental variations or test subject factors can easily derail the fit test process. For example, any excess (compared to required test standards) amount of airborne particulate can invalidate fit tests. On the other hand, because modern HVAC systems run so effectively with HEPA filtration systems, ambient air can often lack the minimum airborne particulate requirements, which may also invalidate fit tests. In other situations, a test subject may simply be extremely fidgety or claustrophobic, which can cause invalid test results.

A Qualitative Fit Test (QLFT) is a pass/fail test that relies on the individual's sensory detection of a test agent, such as taste, smell, or involuntary cough (a reaction to irritant smoke). Individuals who are not sensitive to testing agents, such as heavy smokers, may not react properly to sensory irritants. Depending on the type of QLFT being performed, these tests can be extremely long in duration (15-20 minutes) or the test subject can easily provide false results. Test subjects frequently provide false results because their employment status can depend on the results.

Because of these and other factors, unsuccessful or invalid fit test results are common. An unsuccessful or invalid fit test requires retesting, which can stretch a typical 15-20 minute test into 45 minutes or more. A workplace with hundreds of RU's will often experience fit testing backlogs causing frustration and increased costs. The conventional fit test process presents a substantial logistical challenge in a workplace with a large population of RU's. Moreover, most countries require RU's, as employees, to be paid while taking part in fit tests, which will often times trigger overtime costs for the employer.

A typical large employer (e.g., a hospital with 2000 RUs) often hires a third-party vendor to spend a week and $120,000, in an attempt to fit test employees who use respirators.

As described above, an RU is fit tested periodically to determine fits (against an RU's face) for respirator masks from specific manufacturers, with specific models, and sizes. In the United States, for example, a fit test is mandated by Occupational Safety and Health Administration (OSHA) regulation 29 CFR Part 1910.134, annually.

The annual fit testing requirement was adopted by OSHA in 1998. A 2001 survey of 269,389 businesses requiring employees to wear respirators found that only 57% of these performed fit testing. Federal OSHA reports that, over the last ten years, respiratory protection program violations are consistently in the top five citations issued to employers and fit testing is the third most common factor in employers' non-compliance status. Moreover, a majority of the employers in European Union countries required to adopt fit testing procedures are not compliant. The main reason for non-compliance appears to be the cumbersome nature of the fit test itself.

A notably substantial percentage of RU's are successfully fitted to the same respirator manufacturer, model, and size from a prior visit. In fact, during the public comment period for OSHA's rule-making, data from private companies were considered in establishing the annual fit test requirement. The Texas Chemical Council indicated that, "virtually no individuals fail fit tests a year after initial testing." The Exxon Company reported a less than 1% annual fit test failure rate. Moreover, NIOSH (National Institute of Occupational Safety and Health) has indicated that if an RU hasn't had a significant change in weight (more than 20 pounds), the chances of such a successful subsequent fit test can range from 74.6 percent to 89.6 percent over a three-year period.

Given all the challenges of conventional fit test technology, it is not uncommon for regulatory compliance in a workplace to run well under 50 percent. Even employers who self-report themselves as compliant often will shortcut or skip a number of steps because the process is so cumbersome and time consuming. Current methods for automated respirator fit testing are ineffective and inefficient in protecting many respirator users, but no substantial technological improvements have occurred in this field. Currently there is no viable method to speed up the respirator fit test process using 3D image technology.

SUMMARY

In various example embodiments as disclosed herein, an apparatus and associated method is described, which may relate to a system for predicting a respiratory protection device fit by comparing visit-over-visit data obtained from 2D and/or 3D images, weight information, age information, body mass index (BMI) information, and/or other information. Visit-over-visit deviations may be compared to a predetermined allowable delta (AD) thresholds (e.g., as described herein) to determine a successful or unsuccessful fit of a respiratory protection device (e.g., a respirator mask). This new method is configured to reduce fit test processing time from 15 to 20 minutes down to about 2.5 minutes or less, for example. The images and associated data (e.g., data determined based on the images, weight data, age data, BMI data, and/or other data) being compared include the baseline image of the face and head (and/or measurements determined therefrom) of an individual RU at the time of a successful conventional respiratory protection device fit test (VISIT X), face and head measurements from subsequent images (VISIT X+n) at intervals mandated by safety regulations, intervals determined based on AD values determined from laboratory studies and analysis, and/or other intervals. The data from the VISIT X image is compared to data taken from subsequent images captured in the future (VISIT X+n) and the AD's. Weight data, age data, BMI data, and/or other data may (these examples are not intended to be limiting) also be compared visit over visit and compared to corresponding AD's.

In various example embodiments, the data being analyzed may include U.S. Federal and/or state or any other non-U.S. regulatory authority-identified criteria, which may include 3D facial and head topography data (e.g., linear, surface area, and volumetric data), the 3D image itself, 2D image measurements, a person's weight, age, body mass index (BMI), medical history, history of surgeries and/or facial scars, facial dimensions, and any other information deemed appropriate. Visit-over-visit deviations may be compared to a predetermined threshold of allowable deltas (AD) to determine a successful or unsuccessful fit of the respiratory protection device. In various example embodiments, the data can also be extrapolated to determine the most likely date of expected failure of the respirator fit. The various example embodiments are described in more detail below.

In various example embodiments a system and method for performing automated respirator mask fit testing are described. An example embodiment is configured to obtain, with one or more processors, at least one three-dimensional facial image of an individual; convert the facial image to numerical data for analysis, the numerical data representative of facial features, facial dimensions, and/or facial locations on the face of the individual; determine, based on the numerical data, a head form category for the individual; determine, based on the head form category and the numerical data, a face volume for the individual; and (1) generate a mask fit pass indication responsive to the face volume satisfying face volume fit criteria for the head form category; or (2) generate a mask fit fail indication responsive to the face volume not satisfying the face volume fit criteria for the head form category.

BRIEF DESCRIPTION OF THE DRAWINGS

The various embodiments are illustrated by way of example, and not by way of limitation, in the figures of the accompanying drawings in which.

DETAILED DESCRIPTION

Figure 1:
FIGS. 1 and 2 illustrate the traditional processes for performing conventional respirator fit testing.

In the following description, for purposes of explanation, numerous specific details are set forth in order to provide a thorough understanding of the various embodiments. It will be evident, however, to one of ordinary skill in the art that the various embodiments may be practiced without these specific details.

To mitigate the problems described herein, the inventors had to both invent solutions and, in some cases just as importantly, recognize problems overlooked (or not yet foreseen) by others in the field of respirator mask fitting. Indeed, the inventors wish to emphasize the difficulty of recognizing those problems that are nascent and will become much more apparent in the future should trends in industry continue as the inventors expect. Further, because multiple problems are addressed, it should be understood that some embodiments are problem-specific, and not all embodiments address every problem with traditional systems described herein or provide every benefit described herein. That said, improvements that solve various permutations of these problems are described below.

The following description regularly refers to respirator mask fit testing. It should be noted that the principles described herein may also be applied to fitting other personal protective equipment. For example, the principles described herein may be applied to fitting equipment for industrial head protection (e.g., hats, helmets, etc.), eye and face protection (e.g., goggles, face shields, etc.), and other forms of respiratory protection (e.g., different types of respirators such as filtering facepiece respirators, half face elastomeric respirators, full face elastomeric respirators, etc.; and/or respiratory protection devices instead of and/or in addition to respirators). Still other embodiments may include hand protection (gloves) and clothing (protective shirts, jackets, pants and footwear).

In various example embodiments described herein, a system and method for automated respirator fit testing by comparing two and/or three-dimensional (2D and/or 3D) images (taken at different time points) are disclosed. In various example embodiments described herein, the system and method may be configured for automated respirator fit testing based on three-dimensional images from a single time point. In the various example embodiments described herein, a computer-implemented tool or software application (app) as part of a respirator fit test processing system is described to automate and improve the collection and analysis of respirator fit data of an individual being tested. A computer or computing system on which the described embodiments can be implemented can include personal computers (PCs), portable computing devices, laptops, tablet computers, personal digital assistants (PDAs), personal communication devices (e.g., cellular telephones, smartphones, or other wireless devices), network computers, consumer electronic devices, or any other type of computing, data processing, communication, networking, or electronic system.

Figure 2:
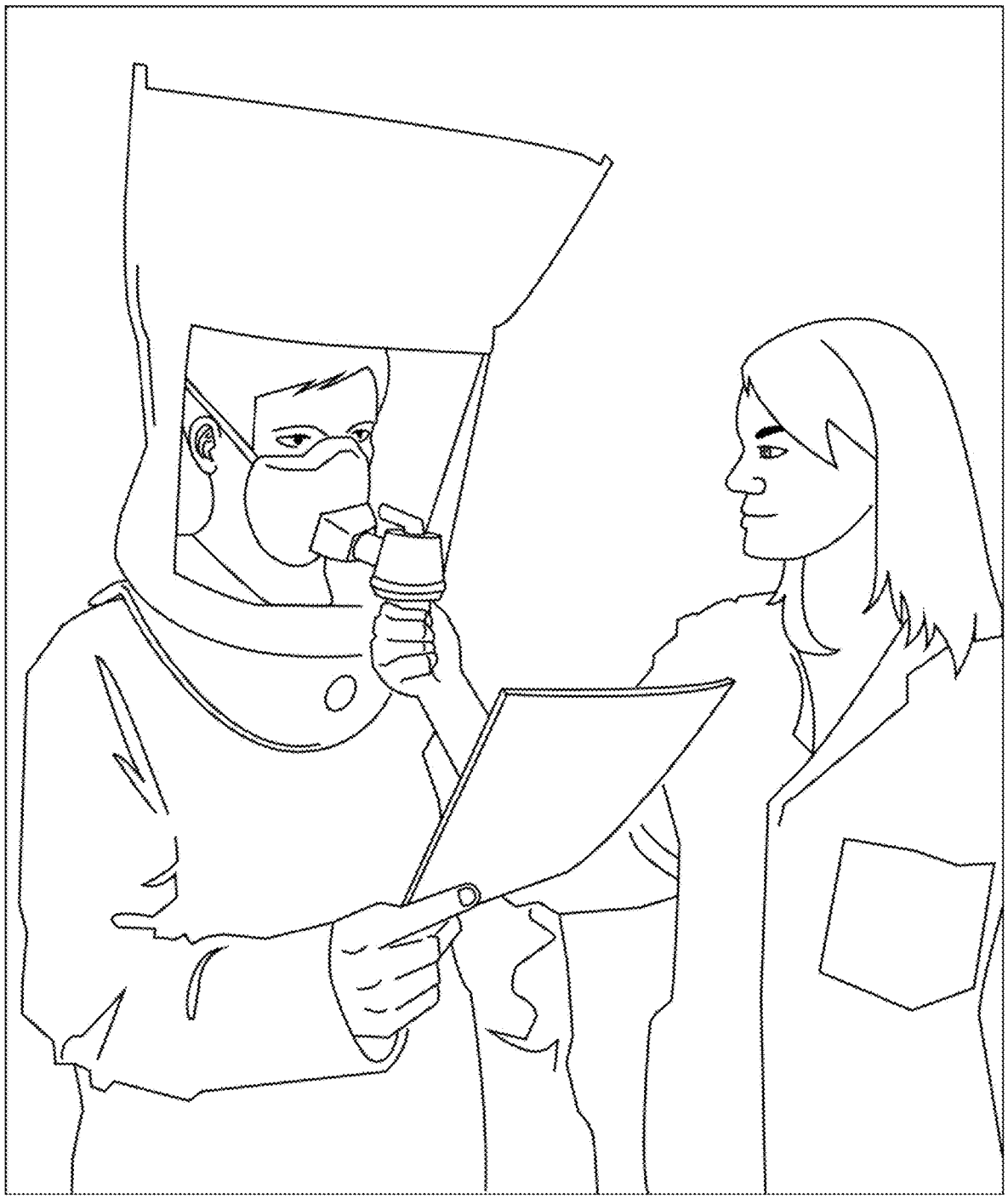

FIGS. 1 and 2 illustrate the traditional processes for performing conventional respirator fit testing. Referring to FIGS. 1 and 2, at VISIT X, when a person is successfully fit tested for a respirator (see FIG. 1 or FIG. 2), identifying personal information and associated respirator information (e.g., manufacturer, model and size) are logged into a database.

Figure 3:
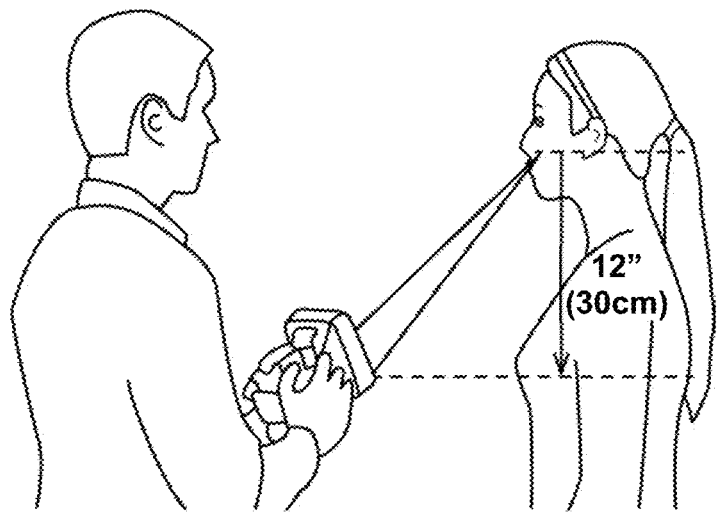
FIGS. 3 through 5 illustrate a process for capturing a 3D image or set of images of an individual's face and head for analysis by an example embodiment.
Figure 4:
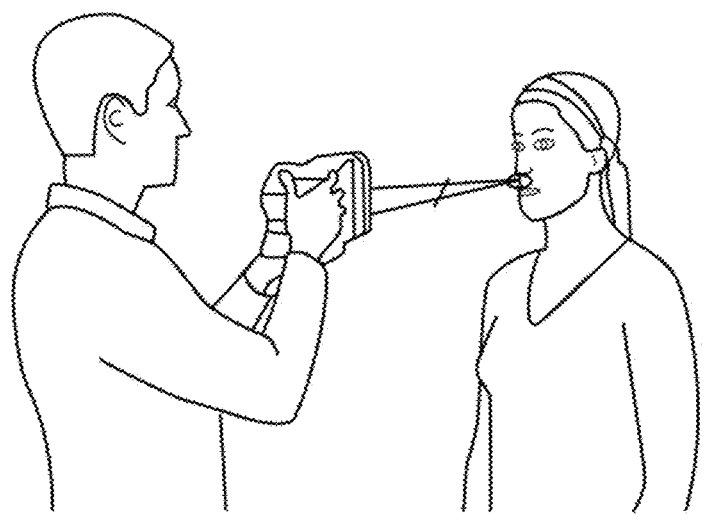
Figure 5:
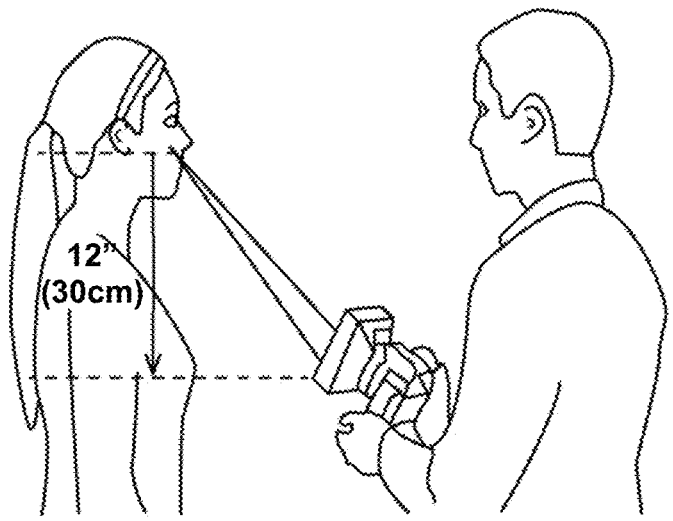
Figure 6:
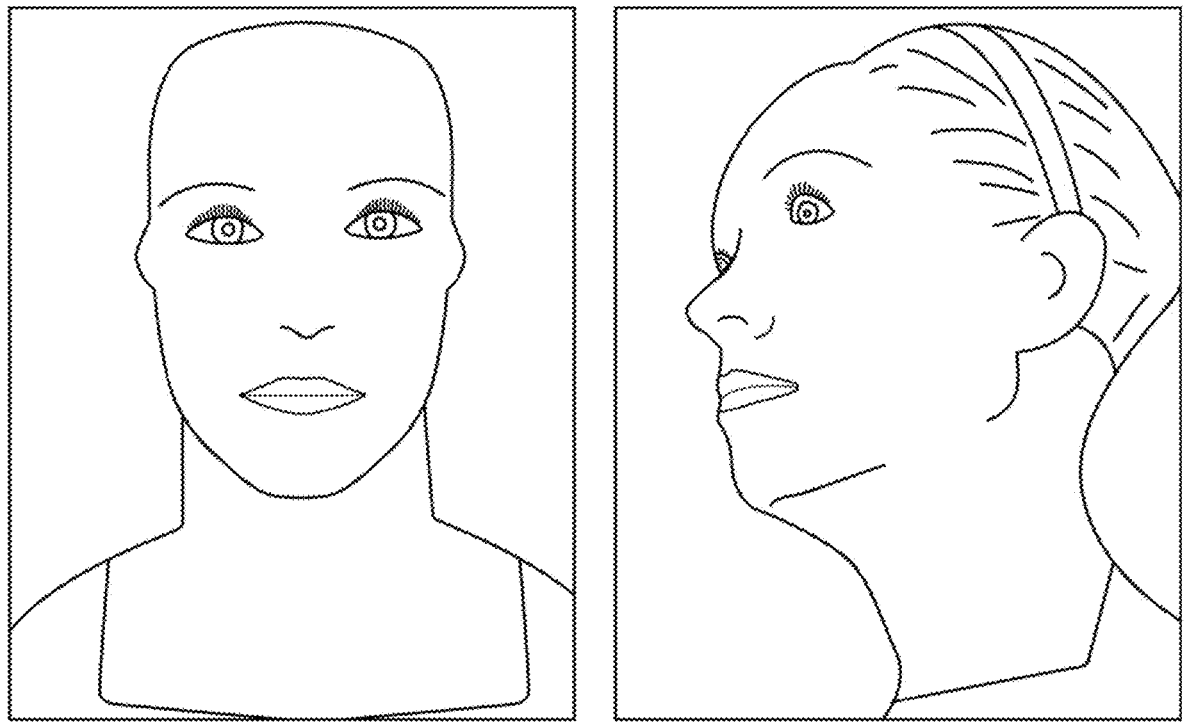
FIGS. 6 and 7 illustrate a sample of at least a portion of the resulting 3D images captured for analysis by an example embodiment.
Figure 7:
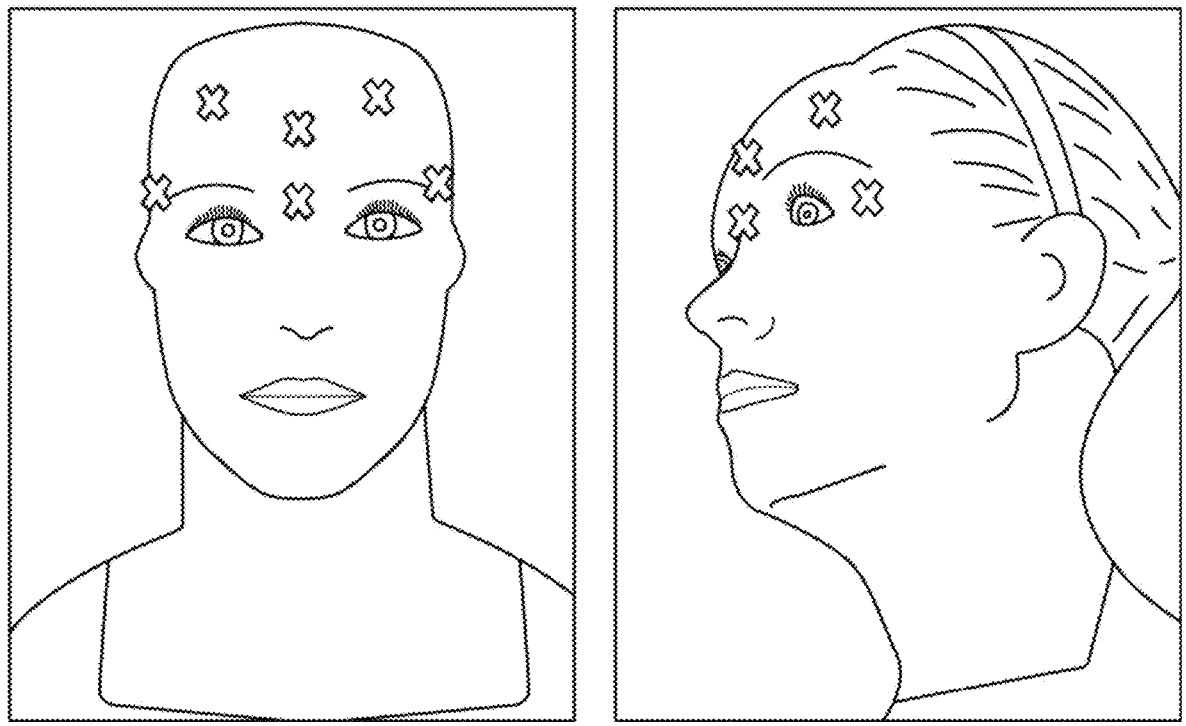

In the various example embodiments described herein, a 3D image or set of (3D and/or 2D) images of the individual's face and head may also be captured (see FIGS. 3 through 5) at an initial respirator mask fitting visit. As shown in FIG. 3, a camera can be positioned below and to the side of the individual's face to capture an image of the individual's face or head. In an example embodiment, a VECTRA™ H1 handheld imaging system or similar system can be used to capture the 3D images. As shown in FIG. 4, the camera can be positioned in front of the individual's face to capture a frontal image of the individual's face or head. As shown in FIG. 5, the camera can be positioned below and to the alternate side of the individual's face to capture another image of the individual's face or head. In an example embodiment, a sample of at least a portion of the resulting 3D images is shown in FIGS. 6 and 7. As shown in FIG. 7, particular points or locations on the face or head of the individual RU in the image set can be identified and saved as reference points to compare images of the RU between a VISIT X and a VISIT X+n. Reference points can be chosen from universal landmarks which are unlikely to change (e.g. eye sockets) and/or topographical landmarks with the least amount of tissue between the bone and skin (e.g. bridge of the nose). The RU's individual data file can be populated with the 3D image or set of images of the individual's face and head and the reference points for analysis by an example embodiment. The 3D image data (for example: data points, reference points, linear and surface area topography, 2D data and volumetric data, etc.) can be converted to numerical values for mathematical computation and analysis.

At VISIT X+n (e.g., a subsequent respirator mask fitting visit), a current 3D image or set of images of the individual's face and head is again captured. In an example embodiment, a VECTRA™ H1 handheld imaging system or similar system can also be used to capture the 3D images. In other embodiments, images can be captured off-site using an app on a personal device (e.g., mobile phone) and the captured images can be submitted by the RU electronically. The data from the current 3D image or set of images of the individual's face and head can be converted to numerical values. The VISIT X+n numerical data is then compared to the image data from VISIT X to determine if common reference points (e.g., the forehead, upper portion of the nose and temples, see FIG. 7) between VISIT X and VISIT X+n are properly aligned to produce valid comparison results. If the common reference points are properly aligned, the VISIT X+n numerical data is compared to VISIT X data to determine if any deviations or a conglomerate of those deviations are within pre-determined allowable deltas (ADs) and/or other threshold values.

If the mathematical deviations between the VISIT X 3D facial image data and VISIT X+n 3D facial image data are equal to or less than the ADs, the RU is considered to have a successful fit test for the same manufacturer, model, and size respirator identified in VISIT X for an additional period of time (e.g., 12 months in the United States; longer period of time in other countries). Based on a computed rate at which the 3D facial image data is approaching the Allowable Deltas, an Expected failure date can be computed. If the mathematical deviations between the VISIT X 3D facial image data and VISIT X+n 3D facial image data are greater than the ADs, the RU is considered to have an unsuccessful fit test and must participate in a conventional QNFT or QLFT.

In some embodiments, the method described herein includes generating a mask fit pass indication responsive to differences between the corresponding facial features, facial dimensions, and/or facial locations on the face of the individual represented in initial visit data and subsequent visit data not breaching the one or more pre-defined ADs. In some embodiments, the method includes generating a mask fit fail indication responsive to differences between the corresponding facial features, facial dimensions, and/or facial locations on the face of the individual represented in the initial visit data and subsequent visit data breaching the one or more pre-defined ADs. Advantageously, the present method of generating the pass or fail indications may be performed for two or more different types (e.g., different manufacturers, models, and/or sizes) of respirator of respirator masks using the same initial visit data and subsequent visit data. For example, a law enforcement officers may need to be fit tested for both a full-face chemical (e.g., tear gas) respirator mask, and/or other partial-face respirator masks (e.g. N95 healthcare respirator masks) that may be used in the line of duty. In some embodiments, the AD's may be representative of, and/or determined based at least in part on, a manufacturer's databases of mask dimensions, etc. (accessed as described herein). In some embodiments, the AD's may change depending on which mask(s) an individual is required to be fit tested on.

In some embodiments, ADs may be determined based on either a variance or interim order granted by Federal and/or state OSHA's or any other appropriate regulatory authority. In some embodiments (e.g., as described below), AD's may be determined based on data gathered for a population of users and/or other information. ADs may be adopted into regulations or they may be entered by an amendment into the regulations. Currently, the International Organization for Standardization, which is very "wearer-centric focused" does not require periodic fit tests beyond the initial fit test. The addition of a periodic respirator fit test as performed by the example embodiments described herein would provide a substantially higher degree of protection for the RU while still being "wearer-centric focused." If the ISO and the United States both adopted the use of a periodic respirator fit test, the global standardization would take a tremendous step forward and greatly assist multi-national companies in protecting their employees and RU's.

In some embodiments, the periodic respirator fit test as performed by the example embodiments described herein may be mandated at shorter time intervals or either before each use of a respirator or at the beginning of an RU's shift, when VISIT X and VISIT X+1 data can be more quickly compared to ADs or completely automated.

Figure 8:
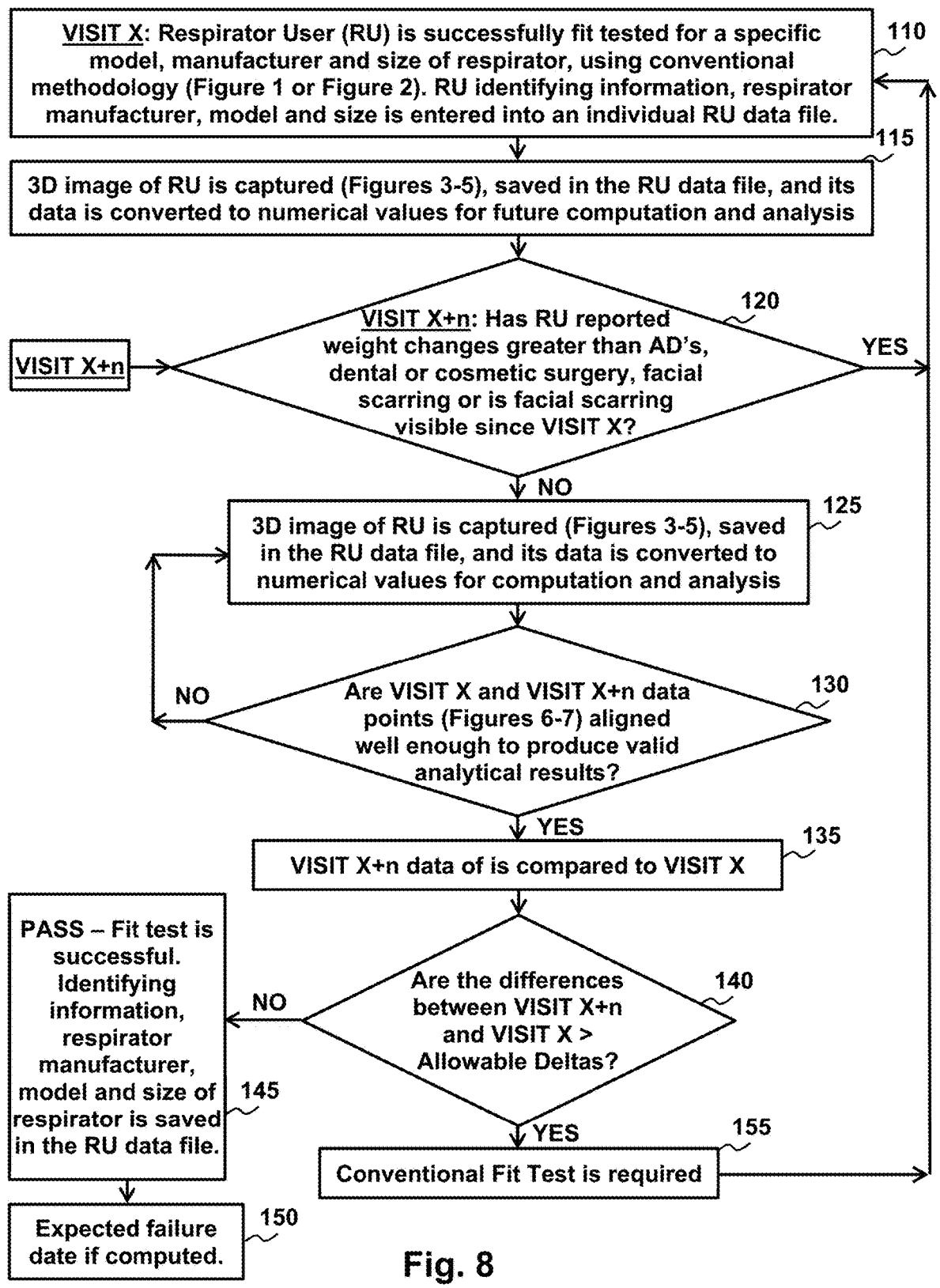
FIG. 8 illustrates a process flow diagram that shows an example embodiment of a method as described herein.

FIG. 8 illustrates a process flow diagram that shows an example embodiment of a method as described herein. Referring now to FIG. 8, at VISIT X: Respirator User (RU) is successfully fit tested for a specific model, manufacturer and size of respirator, using a conventional methodology (see FIG. 1 or FIG. 2). RU identifying information, respirator manufacturer, model and size is entered into an individual RU data file (Process Block 110). A 3D image or set of facial images of the RU is captured (see FIGS. 3 through 5), saved in the RU data file, and the saved data is converted to numerical values for subsequent computation and analysis (Process Block 115). At VISIT X+n: The saved data may be compared to a predetermined threshold of allowable deltas (AD). Has the RU reported weight changes greater than ADs, dental or cosmetic surgery, facial scarring or is facial scarring visible since VISIT X? (Process Block 120). If yes, a new conventional fit test is required at process block 110. A current 3D image or current set of 3D facial images of the RU can be captured (see FIGS. 3 through 5), saved in the RU data file, and the current data is converted to numerical values or data for computation and analysis (Process Block 125). Are the 3D facial image data points from VISIT X aligned well enough with the 3D facial image data points from VISIT X+n (see FIGS. 6 and 7) to produce valid analytical results? (Process Block 130). If not, process block 125 is repeated and a new current 3D image or current set of 3D facial images of the RU can be captured. The 3D facial image data points from VISIT X+n are compared to the 3D facial image data points from VISIT X (Process Block 135). Are the differences between the VISIT X+n 3D facial image data and VISIT X 3D facial image data greater than the Allowable Deltas? (Process Block 140) If yes, a new conventional fit test is required at process block 110. (Process Block 155). If the differences between the VISIT X+n 3D facial image data and VISIT X 3D facial image data is not greater than the Allowable Deltas, a PASS status is recorded and the respirator fit test is successful. Identifying information, respirator manufacturer, model, and size of respirator is saved in the RU data file. (Process Block 145). Based on a computed rate at which the 3D facial image data is approaching the Allowable Deltas, an Expected failure date can be computed. (Process Block 150).

Figure 9:
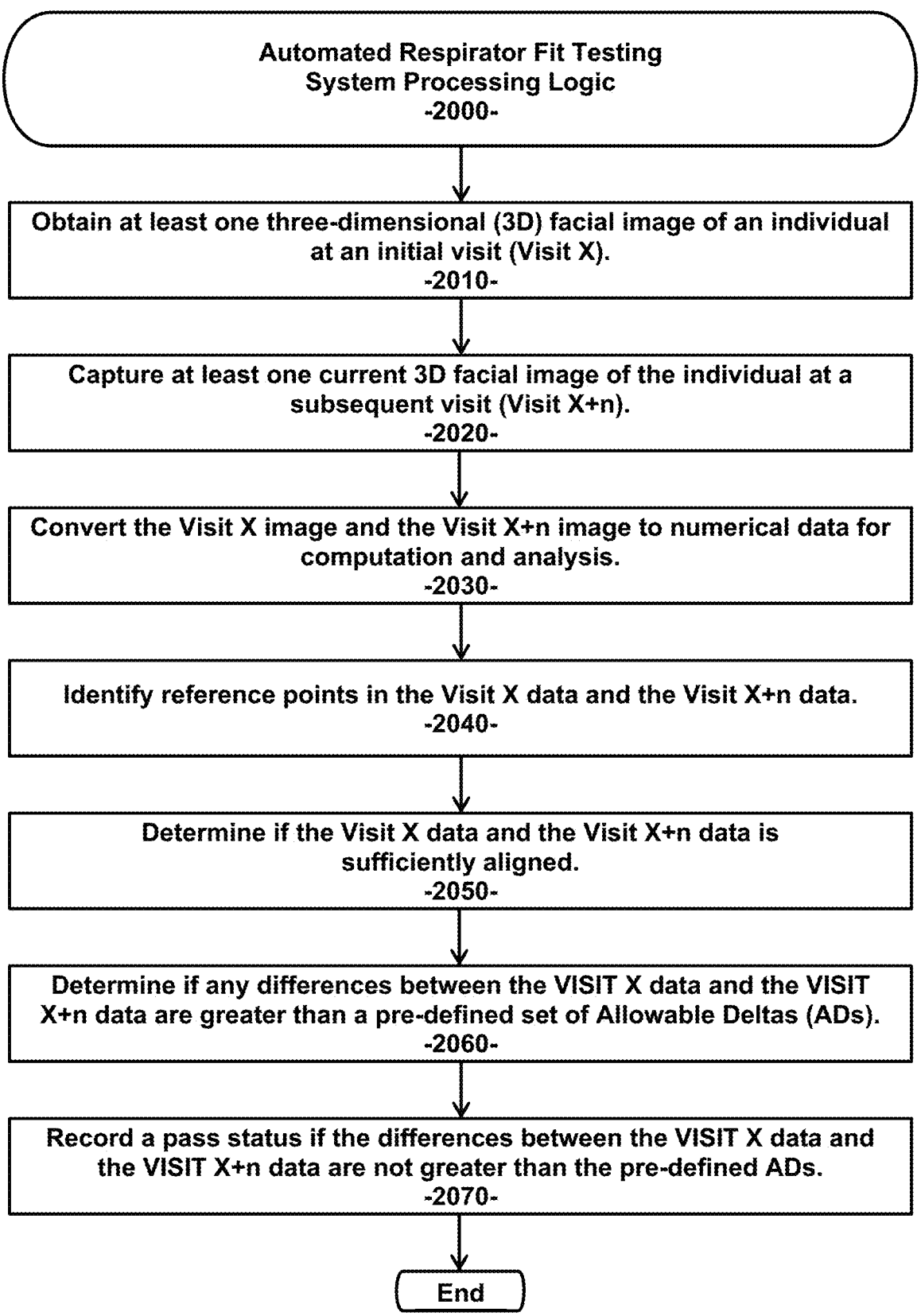
FIG. 9 illustrates another process flow diagram that shows an example embodiment of a method as described herein.

FIG. 9 illustrates another process flow diagram that shows an example embodiment of a method as described herein. The method 2000 of an example embodiment is configured to: obtain at least one three-dimensional (3D) facial image of an individual at an initial visit (Visit X) (processing block 2010); capture at least one current 3D facial image of the individual at a subsequent visit (Visit X+n) (processing block 2020); convert the Visit X image and the Visit X+n image to numerical data for computation and analysis (processing block 2030); identify reference points in the Visit X data and the Visit X+n data (processing block 2040); determine if the Visit X data and the Visit X+n data is sufficiently aligned (processing block 2050); determine if any differences between the VISIT X data and the VISIT X+n data are greater than a pre-defined set of Allowable Deltas (ADs) (processing block 2060); and record a pass status if the differences between the VISIT X data and the VISIT X+n data are not greater than the pre-defined ADs (processing block 2070).

Figure 10:
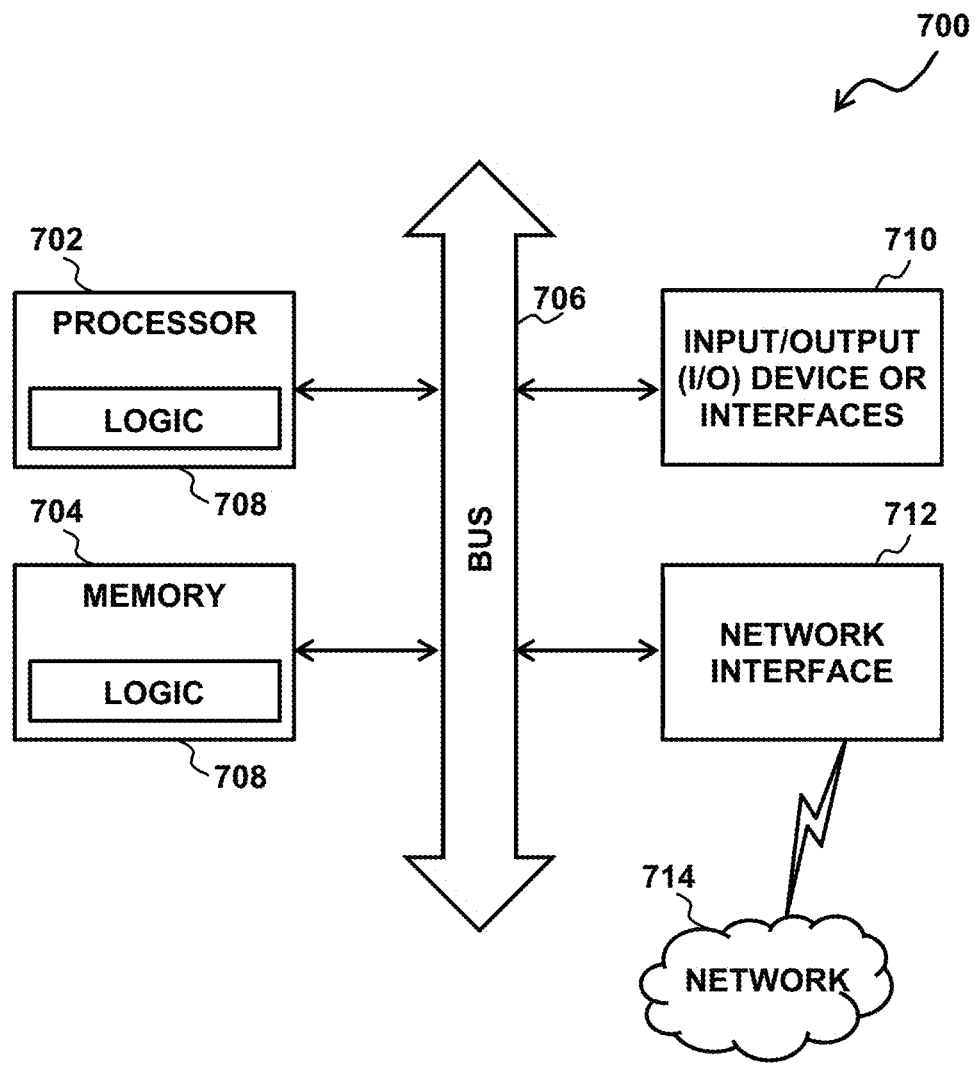
FIG. 10 shows a diagrammatic representation of a machine in the example form of a computer system within which a set of instructions when executed may cause the machine to perform any one or more of the methodologies discussed herein.

FIG. 10 shows a diagrammatic representation of a machine in the example form of a mobile computing and/or communication system 700 within which a set of instructions when executed and/or processing logic when activated may cause the machine to perform any one or more of the methodologies described and/or claimed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a laptop computer, a tablet computing system, a Personal Digital Assistant (PDA), a cellular telephone, a smartphone, a mobile device, a web appliance, a network router, switch or bridge, or any machine capable of executing a set of instructions (sequential or otherwise) or activating processing logic that specify actions to be taken by that machine. Further, while only a single machine is illustrated, the term "machine" can also be taken to include any collection of machines that individually or jointly execute a set (or multiple sets) of instructions or processing logic to perform any one or more of the methodologies described and/or claimed herein.

The example mobile computing and/or communication system 700 includes one or more data processors 702 (e.g., a System-on-a-Chip (SoC), general processing core, graphics core, and optionally other processing logic) and a memory 704, which can communicate with each other via a bus or other data transfer system 706. The mobile computing and/or communication system 700 may further include various input/output (I/O) devices and/or interfaces 710, such as a touchscreen display and optionally a network interface 712. In an example embodiment, the network interface 712 can include one or more radio transceivers configured for compatibility with any one or more standard wireless and/or cellular protocols or access technologies (e.g., 2nd (2G), 2.5, 3rd (3G), 4th (4G) generation, and future generation radio access for cellular systems, Global System for Mobile communication (GSM), General Packet Radio Services (GPRS), Enhanced Data GSM Environment (EDGE), Wideband Code Division Multiple Access (WCDMA), LTE, CDMA2000, WLAN, Wireless Router (WR) mesh, and the like). Network interface 712 may also be configured for use with various other wired and/or wireless communication protocols, including TCP/IP, UDP, SIP, SMS, RTP, WAP, CDMA, TDMA, UMTS, UWB, WiFi, WiMax, Bluetooth™, IEEE 802.11x, and the like. In essence, network interface 712 may include or support virtually any wired and/or wireless communication mechanisms by which information may travel between the mobile computing and/or communication system 700 and another computing or communication system via network 714.

The memory 704 can represent a machine-readable medium on which is stored one or more sets of instructions, software, firmware, or other processing logic (e.g., logic 708) embodying any one or more of the methodologies or functions described and/or claimed herein. The logic 708, or a portion thereof, may also reside, completely or at least partially within the processor 702 during execution thereof by the mobile computing and/or communication system 700. As such, the memory 704 and the processor 702 may also constitute machine-readable media. The logic 708, or a portion thereof, may also be configured as processing logic or logic, at least a portion of which is partially implemented in hardware. The logic 708, or a portion thereof, may further be transmitted or received over a network 714 via the network interface 712. While the machine-readable medium of an example embodiment can be a single medium, the term "machine-readable medium" should be taken to include a single non-transitory medium or multiple non-transitory media (e.g., a centralized or distributed database, and/or associated caches and computing systems) that stores the one or more sets of instructions. The term "machine-readable medium" can also be taken to include any non-transitory medium that is capable of storing, encoding or carrying a set of instructions for execution by the machine and that cause the machine to perform any one or more of the methodologies of the various embodiments, or that is capable of storing, encoding or carrying data structures utilized by or associated with such a set of instructions. The term "machine-readable medium" can accordingly be taken to include, but not be limited to, solid-state memories, optical media, and magnetic media.

Embodiments of the techniques described herein may be implemented using a single instance of computing and/or communication system 700 or multiple systems 700 configured to host different portions or instances of embodiments. Multiple systems 700 may provide for parallel or sequential processing/execution of one or more portions of the techniques described herein.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from system 700 may be transmitted to computer system 700 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present invention may be practiced with other computer system configurations.

As described herein for various example embodiments, a system and method for automated respirator fit testing by comparing two and/or three-dimensional (2D and/or 3D) images are disclosed. In the various example embodiments described herein, a computer-implemented tool or software application (app) as part of a respirator fit test processing system is described to automate and improve the collection and analysis of 2D and/or 3D facial image data for respirator fit testing. In an example embodiment, 3D facial image data is automatically analyzed using data processing and image processing techniques to provide real-time feedback to the individual and testing facility. In various example embodiments described herein, the respirator fit test processing system provides an automated respirator fit testing system as it relates to the industries that use respirators, specifically, to government and commercial entities. As such, the various embodiments as described herein are necessarily rooted in computer processing, image processing, and network technology and serve to improve these technologies when applied in the manner as presently claimed. In particular, the various embodiments described herein improve the use of data processing systems, 3D image processing systems, mobile device technology, and data network technology in the context of automated respirator fit testing via electronic means.

Figure 11:
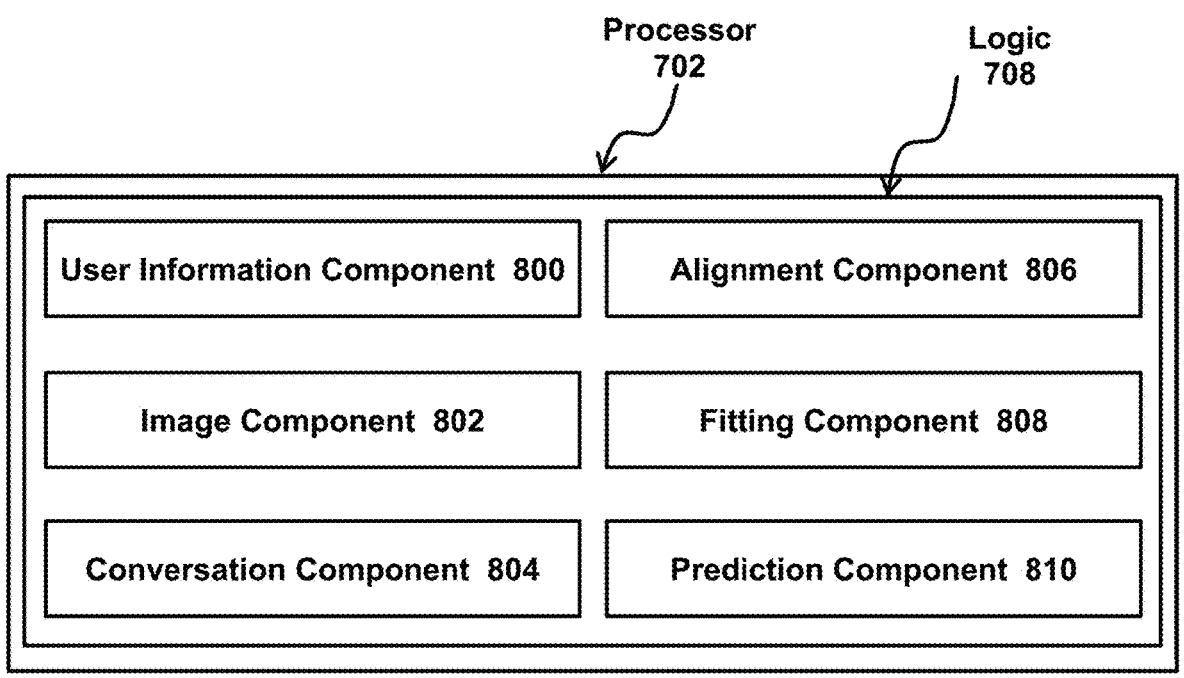
FIG. 11 illustrates another view of a processor and logic of the system shown in FIG. 10 which, when executed, may cause the system to perform any one or more of the methodologies discussed herein.

FIG. 11 illustrates another view of processor 702 and logic 708 of system 700 shown in FIG. 10 which, when executed, may cause the system to perform any one or more of the methodologies discussed herein.

As described above, processor 702 is configured to provide information processing capabilities in system 700. As such, processor 702 may comprise one or more of a digital processor, an analog processor, a digital circuit designed to process information, an analog circuit designed to process information, a state machine, and/or other mechanisms for electronically processing information. Although processor 702 is shown in FIGS. 11 (and 10) as a single entity, this is for illustrative purposes only. In some embodiments, processor 702 may comprise a plurality of processing units. These processing units may be physically located within the same device (e.g., system 700), or processor 702 may represent processing functionality of a plurality of devices operating in coordination. In some embodiments, processor 702 may be and/or be included in a computing device 700 such as a desktop computer, a laptop computer, a smartphone, a tablet computer, a server, and/or other computing devices as described above. Such computing devices may run one or more electronic applications having graphical user interfaces configured to facilitate user interaction with system 700.

As shown in FIG. 11, processor 702 is configured to execute one or more computer program components. The computer program components may comprise software programs and/or algorithms coded and/or otherwise embedded in processor 702, for example. The computer program components may comprise one or more of a user information component 800, an image component 802, a conversion component 804, an alignment component 806, a fitting component 808, a prediction component 810, and/or other components. Processor 702 may be configured to execute components 800, 802, 804, 806, 808, and/or 810 by software; hardware; firmware; some combination of software, hardware, and/or firmware; and/or other mechanisms for configuring processing capabilities on processor 702.

It should be appreciated that although components 800, 802, 804, 806, 808, and 810 are illustrated in FIG. 11 as being co-located within a single processing unit, in embodiments in which processor 702 comprises multiple processing units, one or more of components 800, 802, 804, 806, 808, and/or 810 may be located remotely from the other components. The description of the functionality provided by the different components 800, 802, 804, 806, 808, and/or 810 described herein is for illustrative purposes, and is not intended to be limiting, as any of components 800, 802, 804, 806, 808, and/or 810 may provide more or less functionality than is described. For example, one or more of components 800, 802, 804, 806, 808, and/or 810 may be eliminated, and some or all of its functionality may be provided by other components 800, 802, 804, 806, 808, and/or 810. As another example, processor 702 may be configured to execute one or more additional components that may perform some or all of the functionality attributed below to one of components 800, 802, 804, 806, 808, and/or 810.

User information component 800 is configured to obtain physical, demographic, and/or other information about an individual being fitted for a respirator mask. For example, user information component 800 may be configured to obtain weight information for an individual at an initial respirator mask fitting visit (e.g., a VISIT X as described above) and subsequent respirator mask fitting visits (e.g., a VISIT X+n as described above). As another example, user information component 800 may be configured to obtain information related to facial scarring and/or other facial shape changes that have occurred since a prior mask fitting visit. As another example, user information component 800 may be configured to obtain demographic information for the individual at the initial respirator mask fitting visit and/or the subsequent respirator mask fitting visit. The demographic information may comprise geographical information about a location of the individual, racial information about the individual, information about an age and/or gender of the individual, health information about the individual, information about an industry where the individual works, public health information related to the industry where the individual works, and/or other demographic information.

In some embodiments, user information component 800 is configured to obtain information from entries and/or selections made by via a user interface of the present system. In some embodiments, user information component 800 is configured to obtain information electronically from external resources (e.g., a medical records storage system of a health care provider), electronic storage (e.g., memory 704 shown in FIG. 10) included in system 700, and/or other sources of information. In some embodiments, electronically obtaining information comprises querying one more databases and/or servers; uploading information and/or downloading information, facilitating user input (e.g., via I/O device 710 shown in FIG. 10), sending and/or receiving emails, sending and/or receiving text messages, and/or sending and/or receiving other communications, and/or other obtaining operations. In some embodiments, user information component 800 is configured to aggregate information from various sources (e.g., one or more of the external resources described above, electronic storage, etc.), arrange the information in one or more electronic databases (e.g., electronic storage, and/or other electronic databases), and/or perform other operations.

Image component 802 is configured to obtain at least one initial 2D and/or 3D facial image of an individual from an initial respirator mask fitting visit (e.g., VISIT X), at least one current 2D and/or 3D facial image of the individual from a subsequent respirator mask fitting visit (e.g., a VISIT X+n), and/or other image information. The facial images (e.g., at least one initial 3D image and at least one current 3D image) of the individual may be the 3D image or set of images of the individual's face and/or head captured as described above and shown in FIG. 3-7 (e.g., at different mask fitting visits and/or at other times), for example. The 3D facial images (at least one initial 3D image and at least one current 3D image) of the individual may be and/or include the 3D image data (for example: data points, reference points, linear and surface area topography, 2D data and volumetric data, etc.) described above.

Conversion component 804 is configured to convert the at least one initial facial image and the at least one current facial image to numerical initial visit data and subsequent visit data for analysis. The initial visit data and the subsequent visit data may be representative of facial features, facial dimensions, and/or facial locations on the face of the individual, information related to U.S. Federal and/or state or any other non-U.S. regulatory authority-identified criteria, which may include 3D facial and head topography data (e.g., linear, surface area, and volumetric data), the 3D image itself, 2D image measurements, a person's weight, age, body mass index (BMI), medical history, history of surgeries and/or facial scars, facial dimensions, and/or other information. In some embodiments, the initial visit data and subsequent visit data each comprise millions of individual data points. In some embodiments, the numerical initial visit and subsequent visit data may include data points, reference points, linear and surface area topography, 2D data, volumetric data, etc., from the 3D facial images that has been converted to numerical values for mathematical computation and analysis (e.g., as described herein).

Alignment component 806 is configured to identify facial reference points in the initial visit data and the subsequent visit data. Alignment component 806 is configured to determine whether the facial reference points in the initial visit data and the subsequent visit data meet alignment criteria. Alignment component 806 is configured to verify that the RU in VISIT X+n is the same RU in VISIT X. For example, as described above, the VISIT X+n numerical data may be compared to the data from VISIT X to determine if common reference points (e.g., the forehead, upper portion of the nose and temples, see FIG. 7) are properly aligned and matched (e.g., meet alignment criteria) to produce valid comparison results. Reference points can be chosen from universal landmarks which are unlikely to change (e.g. eye sockets) and/or topographical landmarks with the least amount of tissue between the bone and skin (e.g. bridge of the nose). In some embodiments, the VECTRA H1 and H2 (described herein) determine these reference points automatically, for example. These devices are configured to determine thousands of reference points (e.g., if necessary) for VISIT-over-VISIT comparisons.

In some embodiments, alignment component 806 is configured to make an initial determination as to whether an individual has reported (e.g., made entries and/or selections via a user interface) weight changes, dental or cosmetic surgery, facial scarring, and/or other changes since an initial or prior visit (e.g., VISIT X) that indicate improper (or likely improper) alignment. This determination may be made based on information obtained by user information component 800 and/or other information. Responsive to making such a determination, alignment component 806 may cause the system to indicate (e.g., via a user interface of the system) that a new conventional fit test is required.

Fitting component 808 is configured to determine whether differences between corresponding facial features, facial dimensions, and/or facial locations on the face of the individual represented in the initial visit data and subsequent visit data breach one or more pre-defined ADs. Fitting component 808 is configured to make this determination based on the initial visit data and subsequent visit data, and/or other information. Fitting component 808 is configured to make this determination responsive to alignment component 808 determining that the facial reference points meet the alignment criteria.

For example, as described above, if the common reference points are properly aligned (e.g., the alignment criteria is met), the VISIT X+n numerical data is compared to VISIT X data to determine if any deviations or a conglomerate of those deviations are within pre-determined ADs and/or other threshold values. The data from the baseline visit (VISIT X) are compared to data collected during one or more subsequent visits (VISITS X+n). Any individual data points or subsets of data points that are compared are consistent, visit-over-visit (e.g., because the present system can track millions of individual data points on a face and find any of those points in a subsequent visit, even if the point has moved). If the mathematical deviations between the VISIT X numerical data and VISIT X+n numerical data are equal to or less than the ADs, the RU is considered to have a successful fit test for the same manufacturer, model, and size respirator for an additional period of time (e.g., 12 months in the United States; longer period of time in other countries). If the mathematical deviations between the VISIT X numerical data and VISIT X+n numerical data are greater than the ADs, the RU is considered to have an unsuccessful fit test and must participate in a conventional QNFT or QLFT.

In some embodiments, fitting component 808 may be configured such that the numerical data representative of points on, and/or areas of, the face to be compared include those that come into contact with the respirator mask being evaluated, numerical data from points on, or areas of, the face that would indicate weight loss/gain, and/or numerical data from points on, or other areas, of the face. Fitting component 808 may be configured to compare individual data points in the millions of data points of the initial visit data and subsequent visit data, one or more subsets of data points, and/or other information. For example, fitting component 808 may be configured to determine linear changes (point to point), surface area changes (subsets of points), volumetric changes (subsets of points), and/other changes in the face of the individual being evaluated. Fitting component 808 may be configured to determine 3D facial and/or head topography changes (subsets of points), facial changes based on properties of the 3D images themselves (point to point and/or subsets of points), facial changes based on 2D image measurements (point to point and/or subsets of points), facial changes based on a person's weight (point to point and/or subsets of points), facial changes based on a person's age (point to point and/or subsets of points), facial changes based on a person's race (point to point and/or subsets of points), facial changes based on a person's body mass index (BMI) (point to point and/or subsets of points), facial changes based on a person's medical history (e.g., history of surgeries and/or facial scars) (point to point and/or subsets of points), and/or other information.

In some embodiments, as described above, fitting component 808 is configured to generate a mask fit "pass" indication responsive to differences between the corresponding facial features, facial dimensions, and/or facial locations on the face of the individual represented in the initial visit data and subsequent visit data not breaching the one or more pre-defined ADs. Fitting component 808 may be configured to generate a mask fit "fail" indication responsive to differences between the corresponding facial features, facial dimensions, and/or facial locations on the face of the individual represented in the initial visit data and subsequent visit data breaching the one or more pre-defined ADs.

In some embodiments, fitting component 808 is configured to generate the pass or fail indication based on a cumulative scoring of delta (difference) values tabulated by fitting component 808 across the face. For example, these may include delta values for various points and/or areas where a respirator mask comes into contact with the individual's face, and/or numerous other (e.g., smaller) regions of the face. In some embodiments, fitting component 808 may be configured such that if any one of the cumulative tabulated delta values are greater than the predetermined ADs, a failed fit test is indicated. In some embodiments, fitting component 808 may be configured such that a failed fit test is indicated only if some predetermined combination of two or more of the cumulative tabulated delta values are greater than the predetermined corresponding ADs for those delta values. In some embodiments, a failed fit test may be indicated based on a cumulative score of the deltas for the entire face, or a smaller subset of deltas from one or more limited regions of the face.

By way of a non-limiting example, algorithms may be used to calculate a 3D Fit Score (described below) and/or other scores using the numerical initial visit data and subsequent visit data (e.g., as described above), which may include data from either RUs face in its entirety or subsections of the face (note: individual data from the RU like, for example, excessive weight gain or surgical history since the last fit test may produce a default "fail" notice). When scores from a subsequent visit are compared to the scores associated with the baseline visit or other intervening visits, and the difference is greater than one or more of the ADs, a test "fail" may be indicated.

In some embodiments, generating the "pass" or "fail" indications may include causing the electronic recording of a pass or fail status in electronic storage of the system, transmitting the pass or fail indications to other systems, and/or other operations. In some embodiments, generating the pass or fail indications may include causing the electronic recording or transmission of identifying information, respirator manufacturer, model, and/or a size of respirator tested.

As described above, in some embodiments, determining whether differences (e.g., deltas) between corresponding facial features, facial dimensions, and/or facial locations on the face of the individual represented in the initial visit data and subsequent visit data breach the one or more pre-defined ADs comprises comparing individual data points in the initial visit data to corresponding individual data points in the subsequent visit data. Also as described above, in some embodiments, fitting component 808 is configured to determine whether differences (deltas) between corresponding facial features, facial dimensions, and/or facial locations on the face of the individual represented in the initial visit data and subsequent visit data breach one or more pre-defined ADs by comparing a plurality of facial features, facial dimensions, and/or facial locations on the face of the individual represented in the initial visit data and subsequent visit data to corresponding ADs for the individual facial features, facial dimensions, and/or facial locations. In some embodiments, this may comprise determining a weighted combination of the comparisons of the plurality of facial features, facial dimensions, and/or facial locations on the face of the individual represented in the initial visit data and subsequent visit data to the corresponding ADs for the individual facial features, facial dimensions, and/or facial locations.

In some embodiments, fitting component 808 may be configured such that ADs are generated at manufacture of the present system, responsive to entries and/or selections made via a user interface by a user of the present system, based on a variance or interim order granted by Federal and/or state OSHA's and/or any other appropriate regulatory authority (e.g., as described above), and/or in other ways. In some embodiments, the ADs are generated based on prior facial measurements made on human models, facial measurements made on a population of subjects over time, and/or other sources of information.

By way of a non-limiting example, ADs may be determined based on facial measurements from subjects expecting to lose weight over time. The data from one of these such subjects may be as follows (as shown in Table A):

TABLE A

| DATE | WEIGHT | 3D FIT SCORE | SUCCESSFUL MODEL/SIZE | FIT FACTOR | MODEL/ONE SIZE SMALLER | FIT FACTOR |
|---|---|---|---|---|---|---|
| Jan. 1, 2018 | 250 lbs. | 1.0 (baseline) | 3M 1860/Lg | 250 | 3M 1860/Med | 70 |
| Feb. 1, 2018 | 240 lbs. | 1.22 | 3M 1860/Lg | 210 | 3M 1860/Med | 75 |
| Mar. 1, 2018 | 232 lbs. | 1.28 | 3M 1860/Lg | 180 | 3M 1860/Med | 88 |
| Apr. 1, 2018 | 222 lbs. | 1.33 | 3M 1860/Lg | 89 | 3M 1860/Med | 150 |
| May 1, 2018 | 220 lbs. | 1.0 (baseline) | 3M 1860/Med | 160 | 3M 1860/Sm | 72 |

In the example above, on Apr. 1, 2018, the user went from a large to a medium respirator based on a minimum fit factor of 100 as mandated by Fed OSHA CFR 1910.134 standards for a half-mask or quarter face piece respirator.

As another non-limiting example, the ADs may be generated as follows: A baseline score (noted in the above example as the "3D Fit Score") may be calculated, as described above, when an RU is successfully fit tested to a specific manufacturer, model and size of respirator. The 3D Fit Scores may relate data as described above, which may include the RUs face in its entirety or subsections of the face. In subsequent tests, corresponding 3D Fit Scores may be tabulated. A "change event" may be described as when the RUs fit factor drops below values prescribed in Fed OSHA CFR 1910.134 and/or other standards, for example. When such a change event occurs, the difference between the corresponding 3D Fit Score and the baseline score may be noted as the RU's Delta Value. Through research projects involving dozens of subjects, (e.g., representative) RU's Delta Values may be collected, tabulated and averaged (and/or manipulated with other mathematical transformations), and by using generally accepted statistical research practices, ADs may be established.

As yet another non-limiting example, fitting component 808 may be configured such that ADs may be determined based on information from a population of subjects experiencing weight fluctuations and/or migrating skin, and/or other subjects. An individual subject (RU) may be fitted with a respirator mask and 3D images and other data may be captured (e.g., VISIT X). Periodically, the subjects may be re-fit tested to the same respirator (e.g., VISIT X-n). At these re-fit tests 3D images and other data may be collected (e.g., as described above). When an RU experiences weight gain or loss, or enough skin migration to cause the RU to no longer fit their respirator mask (change event), additional 3D images may be taken and other corresponding data may be collected. Delta values associated with the change event may also be recorded. These delta values for the population of RU's may be tabulated by fitting component 808, and fitting component 808 may determine ADs based on the tabulated data.

In some embodiments, fitting component 808 may be configured such that a process for determining the AD's comprises multiple phases. In some embodiments, a first phase comprises facilitating data gathering using human models (e.g., mannequins and/or other human models) and determining preliminary AD's based on the data gathered using the human models. In some embodiments, a second phase comprises facilitating data gathering using a population of human subjects (e.g., as described above) and adjusting the preliminary AD's based on the data gathered from the population of human subjects. Example details for each of these phases are provided below. However, it should be noted that the number of phases described herein is not intended to be limiting. More or less phases may be used to determine the AD's described herein.

Phase I—Preliminary Allowable Deltas (AD): Human Models

Fitting component 808 may be configured such that Phase I comprises determining a statistically valid population size using human models (e.g., mannequins and/or other human models). Once a population size is established, at a first fit test (e.g., VISIT X), individual human models in the population are successfully fit tested with a respirator using conventional fit testing methods (e.g., as described above). Corresponding unique identifying data (e.g., including fit factor, weight data, and or other data) is recorded in the respirator user (RU) file for a given human model. Corresponding 3D images and 2D images of each model's headform are captured and saved in the RU file. These images are converted to numerical data for mathematical analysis. The numerical data is also recorded in the RU file. The numerical data may include angular measurements, point-to-point measurements, surface areas, face and/or head volume, and/or other information. By way of a non-limiting example, virtual (e.g., 343 cm$^3$) cube external section volumes, surface areas, and point-to-point distance data may be recorded as shown in Table 1, Table 3 and Table 5, respectively appended in EXAMPLE 1 below.

Figure 12:
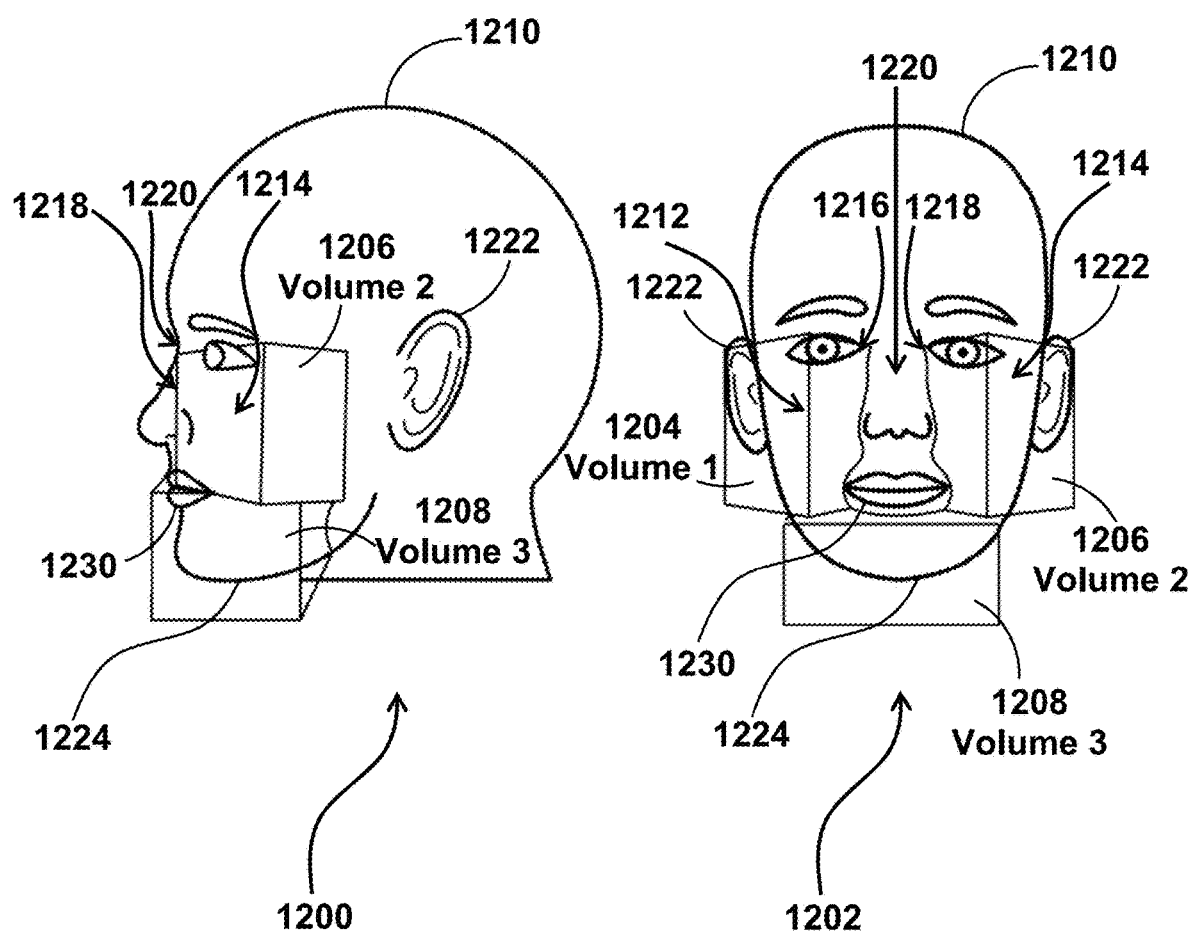
FIG. 12 illustrates example virtual cube external section volumes measured and/or used to determine allowable deltas (ADs) as described herein.

Example virtual cube external section volumes are illustrated in FIG. 12. FIG. 12 illustrates two views 1200 and 1202 of volume of three example virtual cube external section volumes 1204 (Volume 1), 1206 (Volume 2), and 1208 (Volume 3). In some embodiments (e.g., as shown in FIG. 12), Volumes 1 and 2 (1204 and 1206 may extend across an RU's 1210 right and left cheeks 1212 and 1214 respectively. Volumes 1 and 2 (1204 and 1206) may extend from edges 1216 and 1218 of a bridge 1220 of the RU's 1210 nose toward an ear 1222 of the RU 1210 at approximately eye level, and down across the RU's cheek toward the RU's chin 1224, terminating at approximately lip level. Volumes 1 and 2 may be similarly positioned on RU 1210's face, but on the left and right sides of RU 1210's. Volume 3 (1208) substantially surrounds the chin 1224 of RU 1210, extending across the face of RU 1210 just below the bottom lip 1230 of RU 1210. In this example, Volume 1, Volume 2, and Volume 3 are configured to be 343 cm$^3$. In some embodiments, fitting component 808 (FIG. 11) is configured to identify the facial features described above based on the information from the corresponding facial images, and determine the volumes. In some embodiments, the volumes 1, 2, and 3 may be about 343 cm$^3$, for example. The 343 cm$^3$ (for example) is the volume of a 7 cm×7 cm×7 cm cube. The increasing volume of a person losing weight, shown in the tables in EXAMPLE 1 below, is the volume of the cube OUTSIDE of the face. When the subject loses weight, the external portion of the cube's volume increases. This example is not intended to be limiting. Other facial virtual cube external section volumes may be used, the volumes may or may not be the same, more or less than three separate volumes may be used, and the volumes may not be positioned in the locations shown in FIG. 12.

Figure 13:
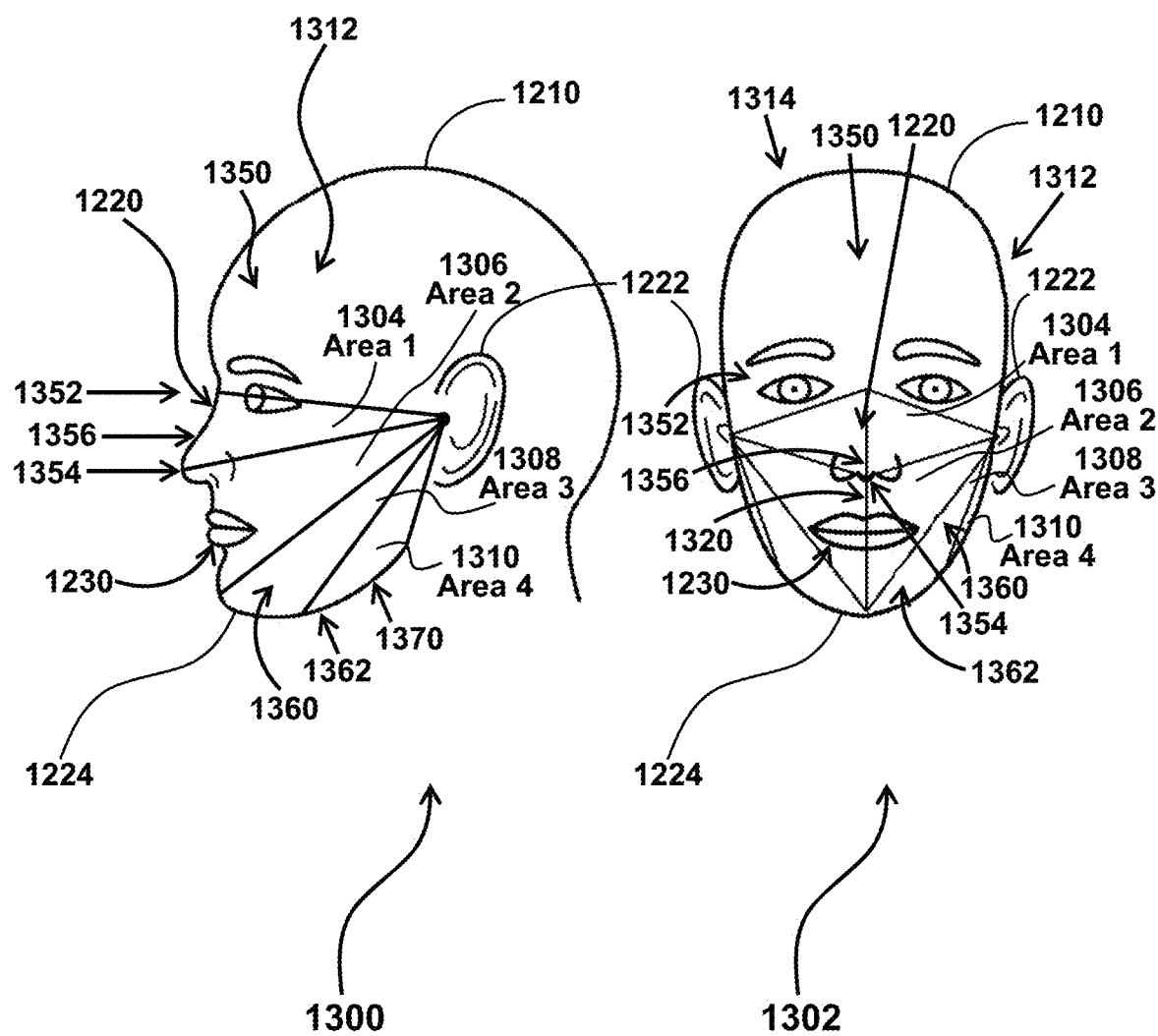
FIG. 13 illustrates example surface areas measured and/or used to determine allowable deltas as described herein.

Example surface areas are illustrated in FIG. 13. FIG. 13 illustrates two views 1300 and 1302 of areas 1304 (Area 1), 1306 (Area 2), 1308 (Area 3), and 1310 (Area 4). Areas 1-4 are illustrated on a left side 1312 of an RU 1210's face. Similar areas (shown but not labeled in FIG. 13) on the right side 1314 of RU 1210's face may also be used. In some embodiments, Areas 1-4 (1304-1310) have a triangular shape with sides that radiate from the ear 1222 of RU 1210 across the face of RU 1210 and terminate at or near a centerline 1320 (e.g., that follows the bridge of the nose 1220 from the forehead 1350 of RU 1210 to chin 1224) of the face of RU 1210. In some embodiments, Area 1 (1304) may range from about eye level 1352 of RU 1210 to a tip 1354 of the nose 1356 of RU 1210 and back to ear 1222 of RU 1210. Area 2 (1306) may range between tip 1354 of nose 1356 of RU 1210, a center (approximately) of chin 1224, and back to ear 1222. Area 3 (1308) may cover a side cheek area 1360 portion of the face of RU 1210, extending from the center of chin 1224, back along a jaw 1362 of RU 1210, and up to ear 1222. Area 4 (1310) may cover a rear jaw portion 1370 of RU 1210 near ear 1222 as shown in FIG. 13. In some embodiments, fitting component 808 (FIG. 11) is configured to identify the facial features described above based on the information from the corresponding facial images, and determine the areas. This example is not intended to be limiting. Other facial areas may be used, the areas may or may not be the same, more or less than four separate areas may be used, and the areas may not be positioned in the locations shown in FIG. 13.

Figure 14:
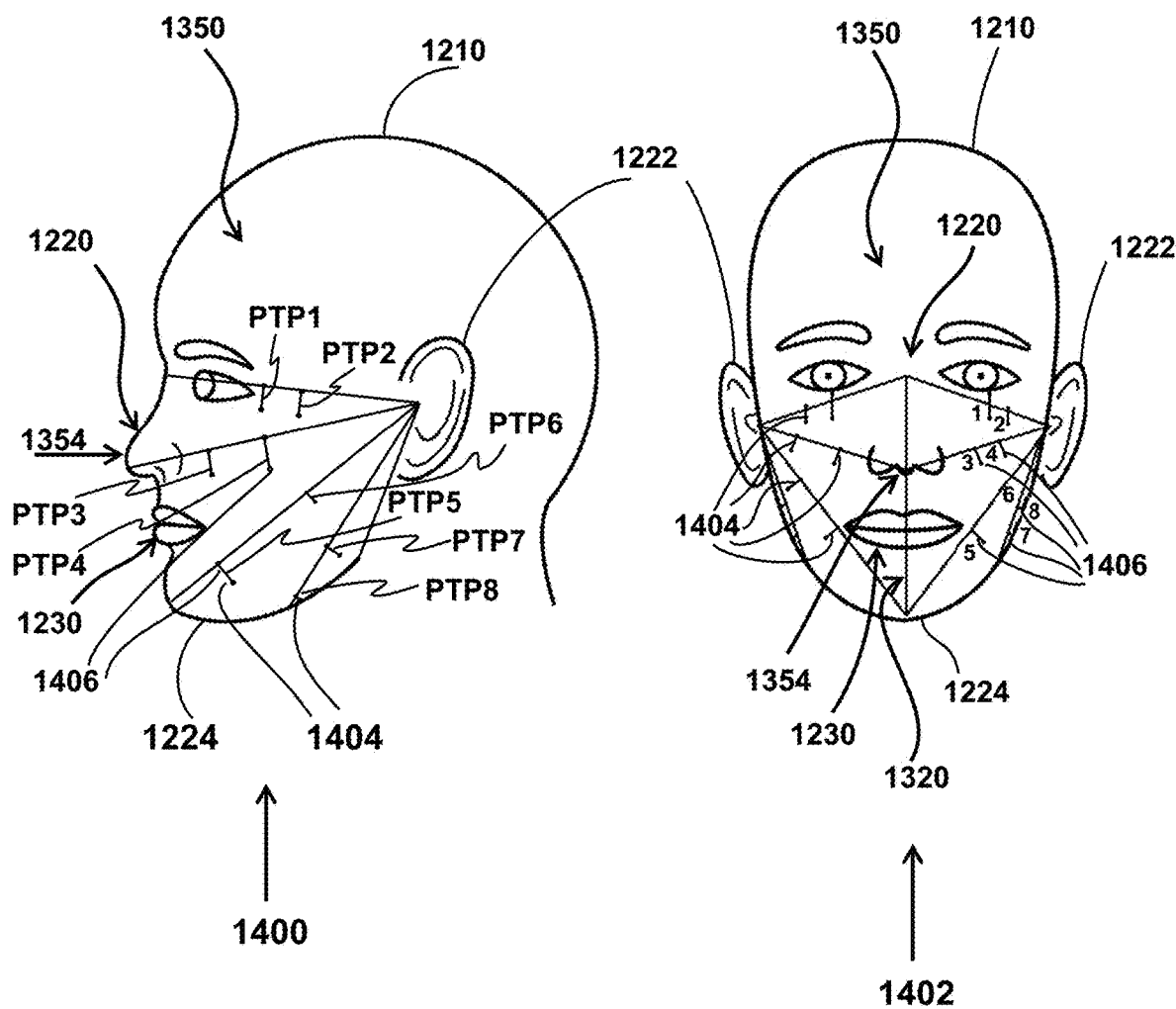
FIG. 14 illustrates example point-to-point distances measured and/or used to determine allowable deltas as described herein.

Example point-to-point distances are illustrated in FIG. 14. FIG. 14 illustrates two views 1400 and 1402 of point-to-point distances PTP1-PTP8. PTP1-PTP8 are shown with corresponding tracer lines 1404 showing examples of possible movement of individual points 1406 on the face of RU 1210. In some embodiments, points 1406 may lie on lines that define the borders of Areas 1-4 shown in FIG. 13. In some embodiments, fitting component 808 (FIG. 11) is configured to identify the facial features described above based on the information from the corresponding facial images, and determine the point-to-point distances. This example is not intended to be limiting. Other facial point-to-point distances may be used, the distances may or may not be the same, more or less than eight separate (per side of an RU's face) distances may be used, and the distances may not be positioned in the locations shown in FIG. 14.

Returning to FIG. 11 and the description of determining AD's as it relates to fitting component 808, at a VISIT X+n, the individual human model headforms are incrementally altered to increase or decrease facial volume, mimicking weight loss or gain in an RU. After such alterations, the individual human models are fit tested with the respirator mask from VISIT X, using conventional fit testing methods. If a human model is successfully fit tested, corresponding unique identifying data (e.g., including fit factor, weight data, and/or other information) is recorded in the RU file. Corresponding 3D images and 2D images of each incrementally-altered human model headform is captured and saved in the RU file. The images are converted to numerical data for mathematical analysis and recorded in the RU file. The numerical data may include angular measurements, point-to-point measurements, surface areas, face and/or head volume, and/or other information (e.g., measurements that correspond to the measurements from VISIT X). By way of a non-limiting example, virtual (e.g., 343 cm$^3$) cube external section volumes, surface areas, and point-to-point distance data for multiple VISITS X+n are recorded as shown in example Table 1, Table 3 and Table 5, respectively appended in EXAMPLE 1 below.

If a change event has occurred, (e.g., a mannequin can no longer be successfully fit tested to the respirator mask used in VISIT X using conventional fit test methods), as described above, corresponding unique identifying data (e.g., including fit factor, weight data, and/or other information) is recorded in the RU file. In this example, a change event occurred at VISIT X+3. Corresponding unique identifying data (e.g., including fit factor, weight data, and or other data) is recorded in the respirator user (RU) file for a given human model. Corresponding 3D images and 2D images of each model's headform are captured and saved in the RU file. These images are converted to numerical data for mathematical analysis. The numerical data is also recorded in the RU file. The numerical data may include angular measurements, point-to-point measurements, surface areas, face and/or head volume, and/or other information. The percentage of change (e.g., the Delta Value) from VISIT X is determined and recorded for the categories of measurement (e.g., volume, area, point-to-point distance) as shown in Tables 1 (VISIT X+3), 3 (VISIT X+3) and 5 (VISIT X+3) of EXAMPLE 1.

These delta values may be combined with other corresponding delta values for other subjects (RUs) as shown in Tables 2, 4 and 6 of EXAMPLE 1 to facilitate aggregation (e.g., by fitting component 808) of the human model population's data. As shown in Table 2, the delta values for the volume measurements for different subjects (RUs) may be listed in the same table. In Table 4, the delta values for the area measurements for different subjects (RUs) are listed. In Table 6, the delta values for the point-to-point measurements for different subjects (RUs) are listed. In some embodiments, as shown in Tables 2, 4, and 6, mean, standard deviation, and/or other values may be determined for the delta values for the different types of measurements (volume, area, point-to-point in this example).

These values and/or other information may be used (e.g., by fitting component 808) to determine the ADs. For example, a preliminary AD (e.g., determined based on the mannequin data) for a given measurement may comprise some function of an average (e.g., across the population of human models) delta value (e.g., % change from VISIT X for a given volume, area, point-to-point distance, etc., measurement) that corresponds to a change event (e.g., a failed fit-test) plus or minus a predetermined number of standard deviations.

In some embodiments, an AD (preliminary or otherwise) may be calculated as follows (the below example is directed to determining an AD for the Virtual Cube External Section Volume category of measurement, but may be similarly applied to other measurements):

$$AD \text{ volume } 3(\text{weight gain or loss}) = \text{mean} + ((\text{standard deviation} \times 2)/2)$$

Using the information in Tables 1 and 2, the above calculation would be:

$$AD \text{ volume } 3(\text{weight loss}) = 20.34\% + ((0.5009 \times 2)/2) = 20.84\%$$

It should be noted that this is just one example of determining one preliminary AD. As described above, in some embodiments, fitting component 808 is configured to determine whether differences (deltas) between corresponding facial features, facial dimensions, and/or facial locations on the face of the individual; age data, weight data, BMI data; and/or other facial or non-facial data; and/or other information represented in the initial visit data and subsequent visit data breach one or more pre-defined ADs by comparing a plurality of facial features, facial dimensions, and/or facial locations on the face of the individual; age data, weight data, BMI data; and/or other facial or non-facial data; and/or other information represented in the initial visit data and subsequent visit data to a corresponding plurality of ADs. In some embodiments, this may comprise determining a weighted combination of AD's and/or other AD criteria.

Using conventional fit testing methods, a human model (e.g. a mannequin) may then be fit tested to the respirator mask identified in VISIT X, but one size smaller (e.g., for simulated weight loss) or one size larger (e.g., for simulated weight gain). Upon a successful fit test, the corresponding unique identifying data (e.g., including fit factor, weight data, and or other data) is recorded in the respirator user (RU) file for a given human model. Corresponding 3D images and 2D images of each model's headform are captured and saved in the RU file. These images are converted to numerical data for mathematical analysis. The numerical data is also recorded in the RU file. The numerical data may include angular measurements, point-to-point measurements, surface areas, face and/or head volume, and/or other information. This data may be recorded in Table 1, Table 3 and Table 5, respectively.

Phase II—Allowable Deltas (AD): Human Subjects

Fitting component 808 may be configured such that Phase II comprises determining a statistically valid population size using human subjects (e.g., not mannequins and/or other human models). Once a population size is established, at a first fit test (e.g., VISIT X), individual subjects in the population are successfully fit tested with a respirator using conventional fit testing methods (e.g., as described above). Corresponding unique identifying data (e.g., including fit factor, weight data, and or other data) is recorded in the respirator user (RU) file for a given subject. Corresponding 3D images and 2D images of each subject's headform are captured and saved in the RU file. These images are converted to numerical data for mathematical analysis. The numerical data is also recorded in the RU file. The numerical data may include angular measurements, point-to-point measurements, surface areas, face and/or head volume, and/or other information. By way of a non-limiting example, virtual (e.g., 343 cm$^3$) cube external section volumes, surface areas, and point-to-point distance data may be recorded as shown in Table 1, Table 3 and Table 5, respectively appended in EXAMPLE 1 below (e.g., the human subject data may be added to the human model data and/or the human subject data may populate its own versions of Tables 1, 3, and 5). (The mannequin (human model) data may be used as a framework to predict what the AD's will be on human subjects.)

At a VISIT X+n, the individual subjects' are fit tested with the respirator mask from VISIT X, using conventional fit testing methods. If a subject is successfully fit tested, corresponding unique identifying data (e.g., including fit factor, weight data, and/or other information) is recorded in the RU file. Corresponding 3D images and 2D images of the subject's headform is captured and saved in the RU file. The images are converted to numerical data for mathematical analysis and recorded in the RU file. The numerical data may include angular measurements, point-to-point measurements, surface areas, face and/or head volume, and/or other information (e.g., measurements that correspond to the measurements from VISIT X). By way of a non-limiting example, virtual (e.g., 343 cm$^3$) cube external section volumes, surface areas, and point-to-point distance data for multiple VISITS X+n may be recorded as shown in example Table 1, Table 3 and Table 5, respectively appended in EXAMPLE 1 below (and/or similar tables).

If a change event has occurred, (e.g., a subject can no longer be successfully fit tested to the respirator mask used in VISIT X using conventional fit test methods), as described above, corresponding unique identifying data (e.g., including fit factor, weight data, and/or other information) is recorded in the RU file. In this example, a change event may occur at VISIT X+3 (as described above for the mannequin models and/or at other times). Corresponding unique identifying data (e.g., including fit factor, weight data, and or other data) is recorded in the respirator user (RU) file for a given subject. Corresponding 3D images and 2D images of each subject's headform are captured and saved in the RU file. These images are converted to numerical data for mathematical analysis. The numerical data is also recorded in the RU file. The numerical data may include angular measurements, point-to-point measurements, surface areas, face and/or head volume, and/or other information. The percentage of change (e.g., the Delta Value) from VISIT X is determined and recorded for the categories of measurement (e.g., volume, area, point-to-point distance) as shown in Tables 1 (VISIT X+3), 3 (VISIT X+3) and 5 (VISIT X+3) of EXAMPLE 1.

The subject may then be fit tested using conventional fit testing methods to the next smaller (e.g., for weight loss) or larger (e.g., for weight gain) size of the same respirator mask used for VISIT X. Corresponding images and information (e.g., as described above) may be saved in the RU file.

The delta values for fit tests that correspond to change events and/or other information may be used (e.g., by fitting component 808) to validate the preliminary ADs determined based on the human model data, adjust the ADs determined based on the human model data, and/or determine new ADs based on the data for the human subjects. For example, if a subject's percentage change (delta value) in a measurement category (e.g., volume, area, point-to-point distance, etc.) for a fit test that corresponds to a change event is greater than the preliminary AD for that measurement determined based on the human model data (e.g., Phase I described above), then the preliminary AD may be considered validated. In some embodiments, if the fit tests of the overall population of subjects is successfully correlated to the preliminary ADs with a sensitivity level of <0.05 (for example), the preliminary AD(s) may be considered valid.

In some embodiments, the human subject population's average deltas and standard deviations may be combined (e.g., with or without the human model data) to determine ADs for any and/or all measurement categories.

This example should also be considered to extend to embodiments that utilize a plurality of weighted ADs and/or other AD criteria. For example, the present method may include determining and using ADs for one or more categories of measurements. Separate ADs may be determined for weight and/or facial and/or head volume increases and volume decreases, for example, because the areas where a respirator interacts with the skin is more adversely affected by weight loss than weight gain. In weight loss scenarios, faces are more likely to create concave features, for example. On the other hand, in weight gain scenarios, facial features "fill out", creating a better seal between the respirator and the face. In some embodiments, an aggregation of weighted ADs for different categories of measurements, may be used to predict successful or unsuccessful fit tests. Table B below lists possible weighting ranges for ADs related to various measurement categories.

TABLE B

| Category of Measurement | Expected Ratios (weight loss or weight gain scenarios) |
| --- | --- |
| AD Volume 1 | 20-33.3% |
| AD Volume 2 | 20-33.3% |
| AD Volume 3 | 20-33.3% |
| AD Point to Point (average AD) | 6-20% |
| AD Surface Area (average AD) | 3-5% |
| AD Age | 3-5% |
| AD Weight | 10-20% |
| AD Body Mass Index | 3-5% |
| TOTAL | 100% |

In some embodiments, fitting component 808 may be configured to adjust the AD's until there is a 95% correlation (and/or other correlations) between the human model population and the human subjects.

These examples are not intended to be limiting. For example, data is presented in tables (e.g., in EXAMPLE 1) to ease a reader's understanding. The number of subjects (RUs) and the number and types of measurements described are intended as example. It should also be noted that aspects of any or all of these examples may be combined to determine one or more AD's. Other examples are contemplated, and development is expected. These examples are meant to represent other embodiments which one of ordinary skill in the art performing similar operations would be motivated to produce by the spirit and scope of the described examples (and the other examples described throughout the specification).

In some embodiments, fitting component 808 may be configured to categorize the face of the individual into a NIOSH Headform Category based on the initial visit data, the subsequent visit data, and/or the differences between the corresponding facial features, facial dimensions, and/or facial locations on the face of the individual represented in the initial visit data and subsequent visit data. In some embodiments, the NIOSH Headform Categories include small, medium, large, long/narrow, and short/wide. In some embodiments, fitting component 808 may be configured to determine and/or adjust the one or more pre-defined ADs based on the categorized NIOSH Headform Category (e.g., such that there are sets of ADs for individuals with different headforms).

In some embodiments, fitting component 808 may be configured to determine a recommended respirator mask manufacturer and/or model and size for the individual based on the initial visit data, the subsequent visit data, the differences between the corresponding facial features, facial dimensions, and/or facial locations on the face of the individual represented in the initial visit data and subsequent visit data, the NIOSH Headform Category, and/or other information. In some embodiments, fitting component 808 may be configured to access one or more external databases of mask manufacturer and model data (e.g., from one or more cooperating mask suppliers). In some embodiments, mask manufacturer and model data is stored by the present system. For example, mask manufacturers may submit mask model data to the present system, where it may be stored in an internal system database for later access.

In some embodiments, fitting component 808 may be configured to determine, based on the differences between the corresponding facial features, facial dimensions, and/or facial locations on the face of the individual represented in the initial visit data and subsequent visit data, presence of a temporary facial blemish. In such embodiments, fitting component 808 may be configured to adjust the determination of whether the differences between the corresponding facial features, facial dimensions, and/or facial locations on the face of the individual represented in the initial visit data and subsequent visit data breach the one or more pre-defined ADs (e.g., to avoid and/or decrease incorrect "pass" or "fail" fitting determinations). In some embodiments, determining a temporary facial blemish may be included in, and/or be an output of the computation and tabulation of the 3D Fit Score described above. For example, fitting component 808 may be able to determine the temporary nature of a pimple, and adjust for the temporary nature of the pimple in the 3D Fit Score scoring. This adjustment may include eliminating one or more ADs (e.g., an AD for the area of the face where the blemish is located), temporarily changing (e.g., reducing) the weight of an AD affected be the blemish in an algorithm, and/or making other adjustments.

In some embodiments, fitting component 808 may be configured for automated respirator fit (and/or other personal protective equipment fit) testing based on one or more three-dimensional images from a single time point. This may include one or more three-dimensional images associated with the initial visit data, subsequent visit data, OR other data, without the need for corresponding three-dimensional images associated with the initial visit data AND the subsequent visit data. For example, a three dimensional image may be obtained (e.g., at an initial visit or a subsequent visit) and converted into numerical data for analysis as described above (e.g., a 3D facial image may be converted to numerical data representative of facial features, facial dimensions, facial locations on the face of the individual, and/or other information) by image component 802, conversion component 804, and/or other components. Fitting component 808 may determine a headform category for the individual based on the numerical data and/or other information. Based on the headform category, the numerical data, and/or other information, fitting component 808 may determine a face volume for the individual (e.g., without the need for data from a second time point). Fitting component 808 may generate a mask fit pass indication responsive to the face volume satisfying face volume fit criteria for the head form category; or a mask fit fail indication responsive to the face volume not satisfying the face volume fit criteria for the head form category. These operations are further described below.

In some embodiments, fitting component 808 may be configured such that determining the headform category for the individual comprises determining a face length and a face width and/or other facial dimensions of the individual; and determining the head form category based on the face length and the face width. The face length, the face width, and/or other facial dimensions may be determined from the numerical data and/or other information.

Figure 15:
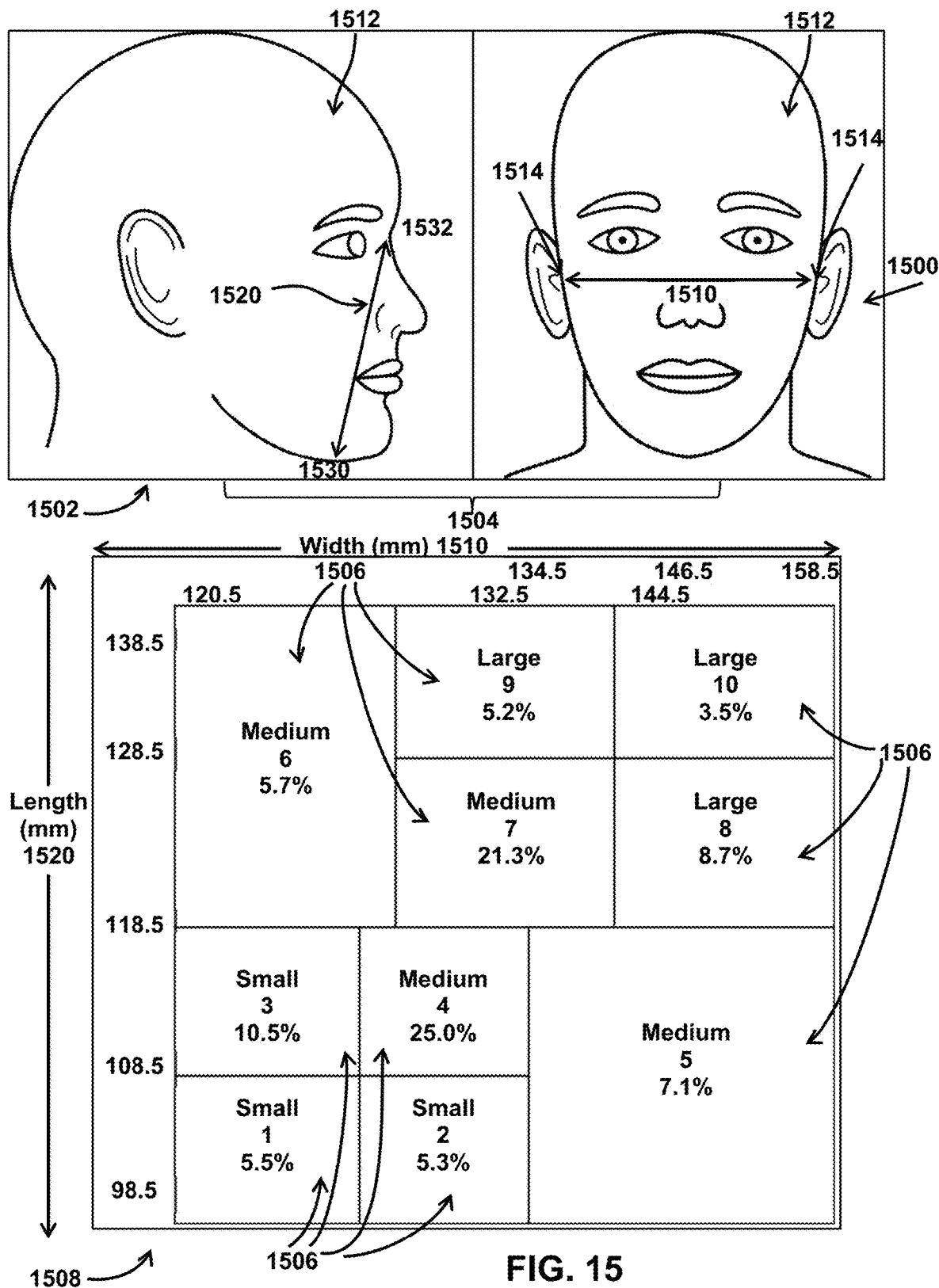
FIG. 15 illustrates determining face width and face length, and determining a headform category based on the determined width and length.

By way of a non-limiting example, FIG. 15 illustrates determining 1500 face width, determining 1502 face length, and determining 1504 a head form category 1506 using chart 1508 based on the determined width and length. As shown in FIG. 15, in some embodiments, determining 1500 face width comprises determining a maximum horizontal breadth 1510 of the face 1512 between the zygomatic arches 1514. In some embodiments, determining 1502 face length comprises determining a distance 1520 in the midsagittal plane between the menton landmark 1530 and the sellion landmark 1532 of face 1512. These distances may be determined by finding corresponding data points in the numeral data and electronically determining the distance(s) between the datapoints, measuring the distance(s) using a caliper (and/or other similar tooling), and/or determining these distances using other methods. Once distances 1510 (width) and 1520 (length) have been determined, they may be used to determine a location in chart 1508 that corresponds to the specific distances 1510 and 1520 (e.g., by electronically comparing the distances to corresponding limits for each headform category). Labeled numbers (e.g., 1-10) in each panel cell of chart 1508 may be arbitrarily assigned reference numbers for identification purposes. Percentages are that of the sampled subjects belonging to a given category relative to the whole population of subjects (e.g., adding the percentages totals 97.8%—some subjects may be outliers and thus not included in the study).

Figure 16:
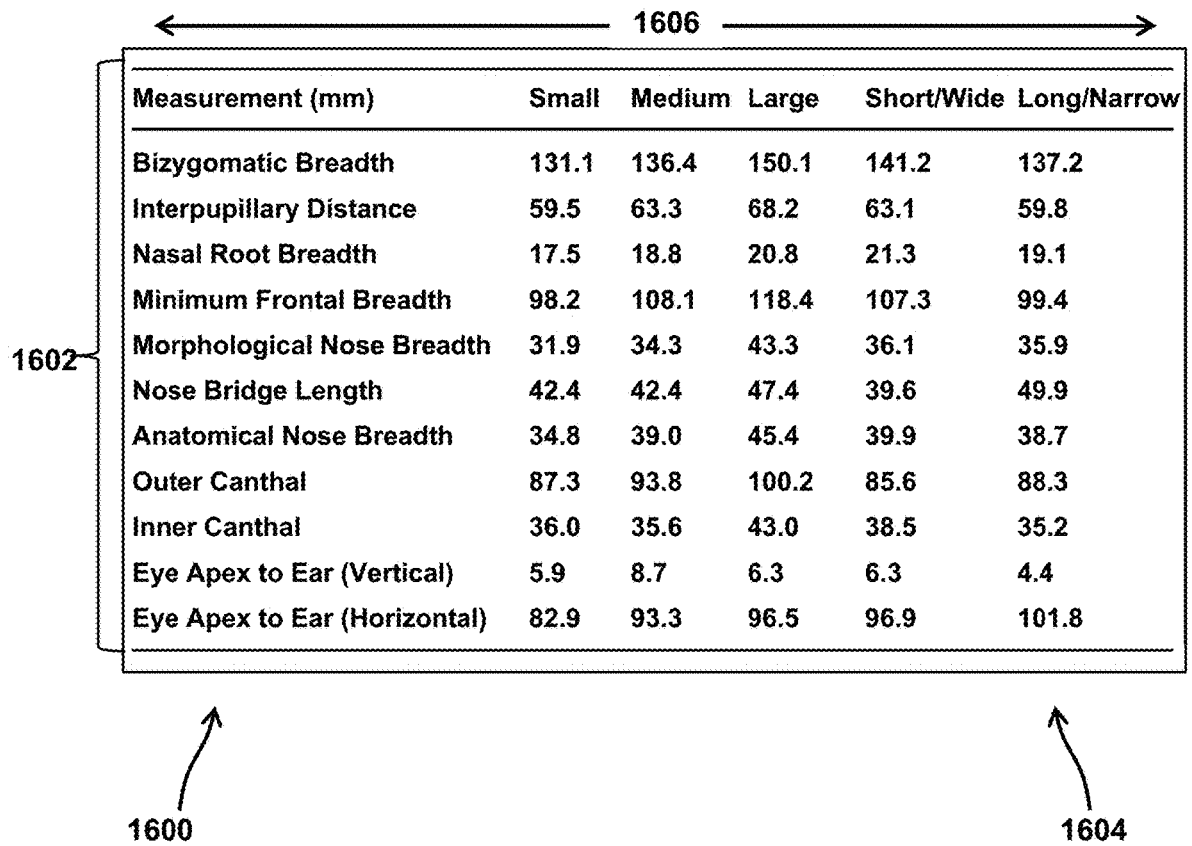
FIG. 16 shows a chart listing additional facial features and corresponding dimensions for different headform categories.

In some embodiments, headform categories may be determined using facial dimensions in addition to and/or instead of face width and face length. For example, FIG. 16 shows chart 1600 listing additional facial features 1602 and corresponding dimensions 1604 for different headform categories 1606. These dimensions may include bizygomatic breadth, interpupillary distance, nasal root breadth, minimum frontal breadth, morphological nose breadth, nose bridge length, anatomical nose breadth, outer canthal, inner canthal, eye apex to ear (vertical), eye apex to ear (horizontal), and/or other dimensions. Any and/or all of these dimensions 1604 may be compared to facial dimensions for an individual to determine which headform category the individual falls into.

Returning to FIG. 11, in some embodiments, fitting component 808 may be configured to determine the face volume by generating a mesh that represents the face of the individual. The mesh may be generated based on the at least one three-dimensional (3D) facial image, the numerical data, and/or other information. Fitting component 808 may be configured to identify a reference location in the mesh corresponding to a specific location on the face of the individual; cut the mesh at one or more target distances from the reference location; and determine the face volume for an area of the face defined by the cut mesh.

Figure 17A:
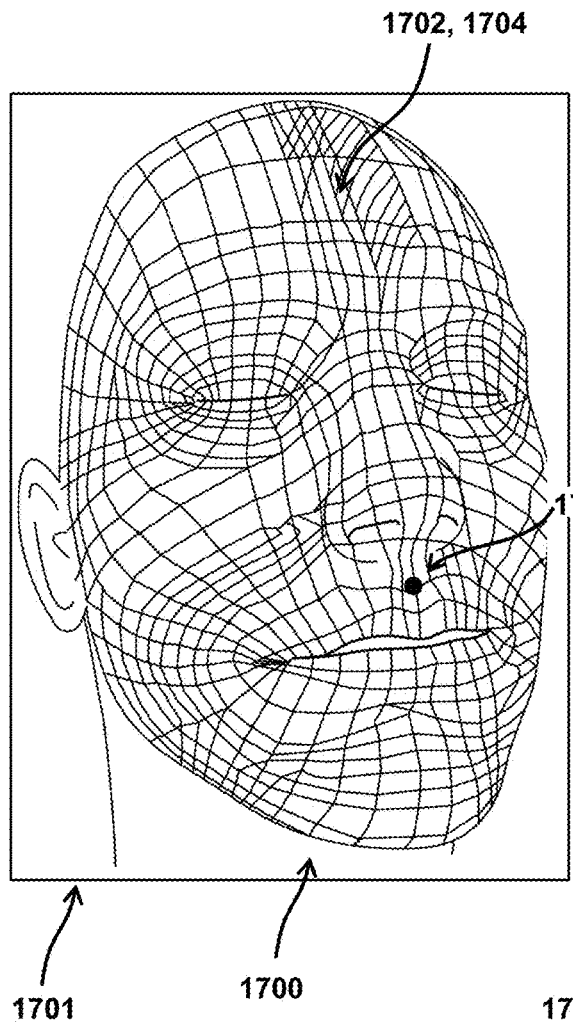
FIG. 17A illustrates an example view of a mesh that represents the face of an individual and may be used to determine a face volume for the individual.
Figure 17B:
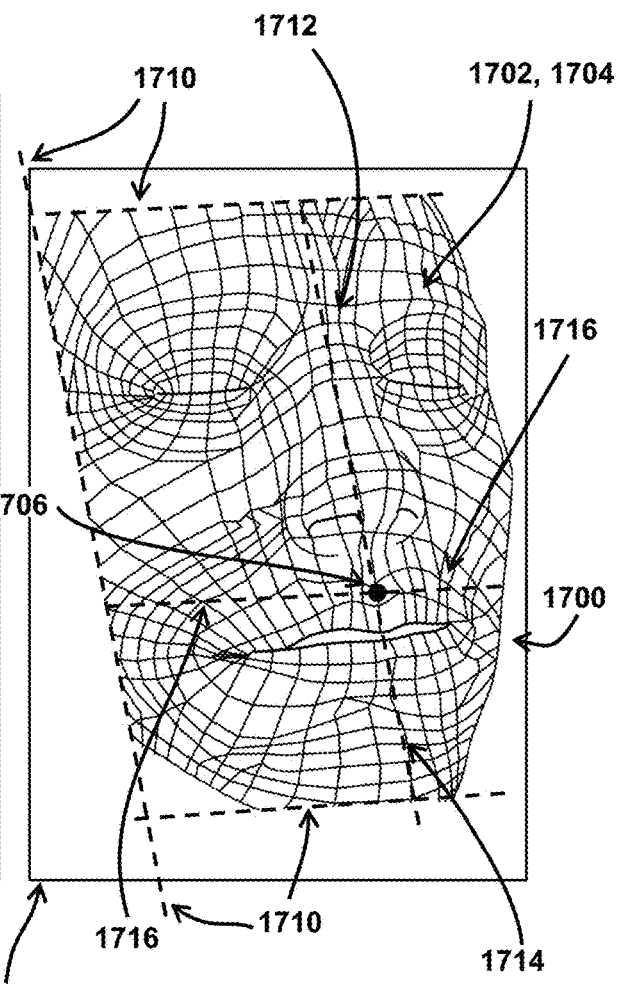
FIG. 17B illustrates another example view of the mesh that represents the face of the individual and may be used to determine the face volume for the individual.

FIG. 17A illustrates an example view 1701 of a mesh 1700 generated by fitting component 808 (FIG. 11) that represents the face 1702 of an individual 1704. A reference location 1706 in mesh 1700 corresponding to a specific location on the face 1702 of the individual 1704 has been identified. In this example, location 1706 corresponds to the subnasion (an area directly under the nose). In view 1703 shown in FIG. 17B, mesh 1700 has been cut 1710 at target distances 1712, 1714, 1716 from reference location 1706. The face volume is determined for the area of the face 1702 defined by the cut mesh 1700 (e.g., as described herein). In some embodiments, cuts 1716 may not be necessary (e.g., because fitting component 808 (FIG. 11) is configured to include the whole width of face 1702).

Figure 17C:
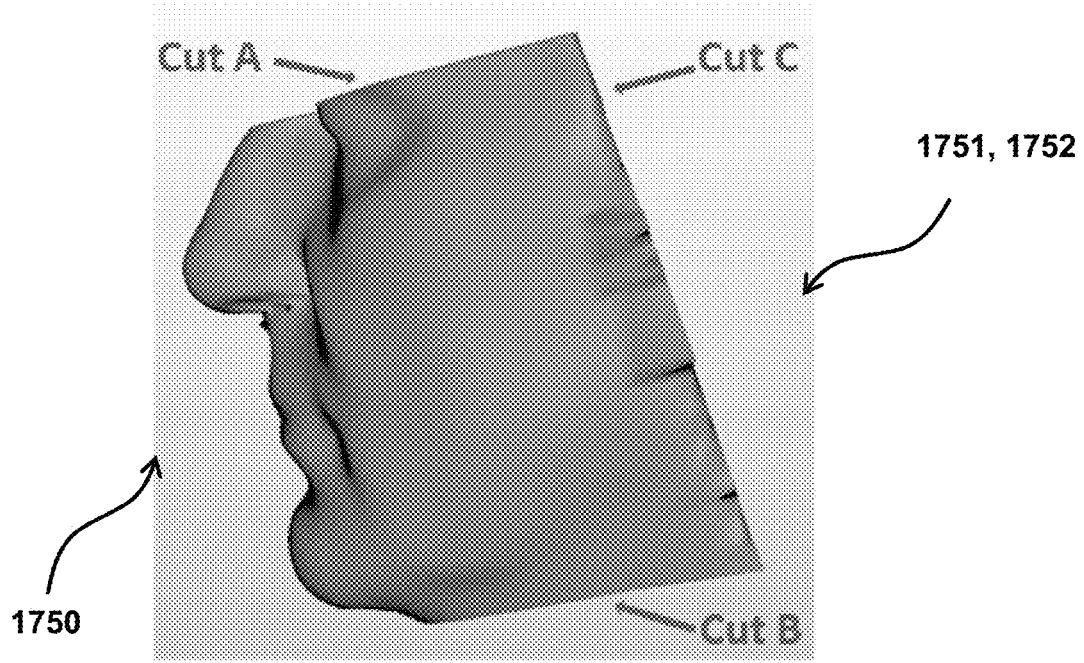
FIG. 17C illustrates an example view of a scan that represents the face of an individual and may be used to determine a face volume for the individual.
Figure 17D:
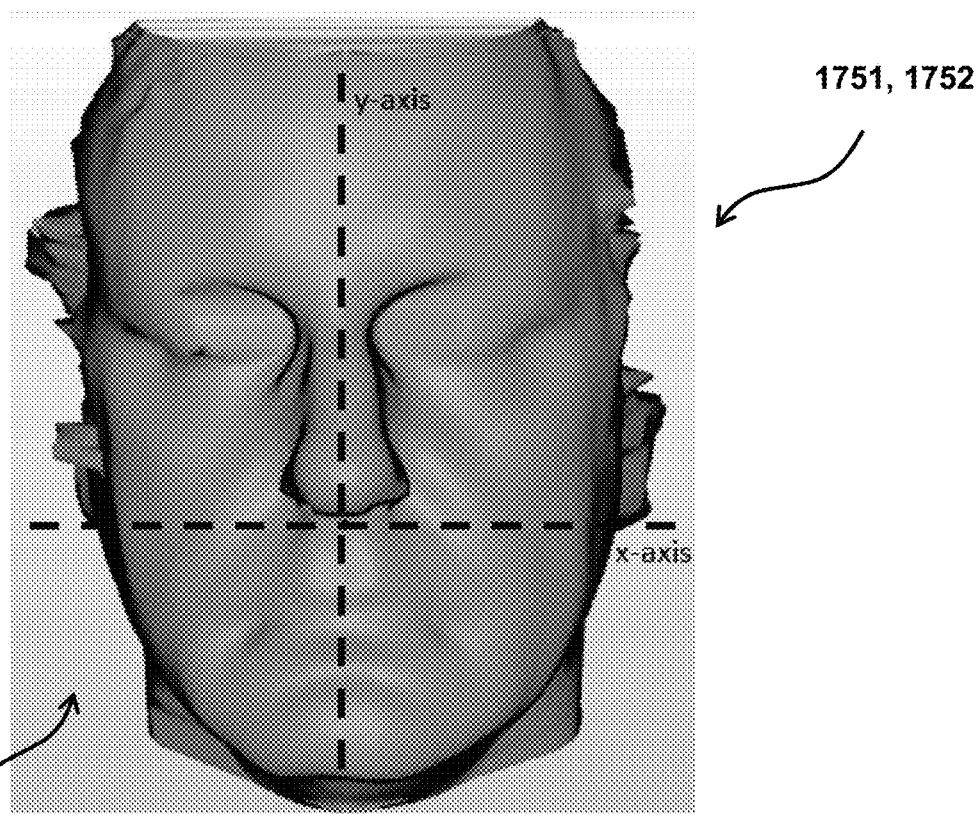
FIG. 17D illustrates another example view of the scan that represents the face of the individual and may be used to determine the face volume for the individual.
Figure 17E:
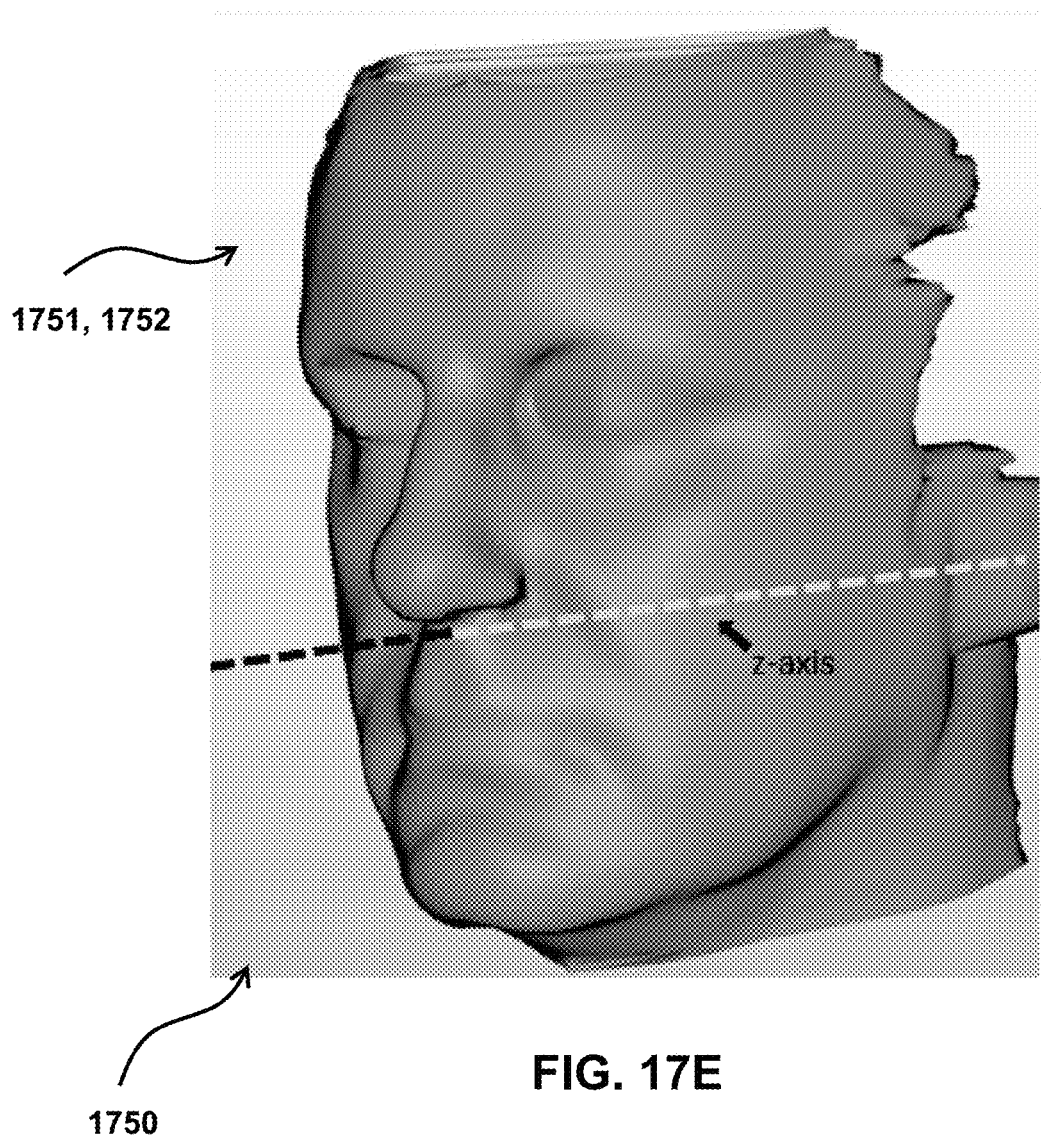
FIG. 17E illustrates another example view of the scan that represents the face of the individual and may be used to determine the face volume for the individual.

FIGS. 17C, D, and E illustrate an example view of a scan 1750 that represents the face 1751 of an individual 1752 and may be used to determine a face volume for individual 1752. In some embodiments, fitting component 808 (FIG. 11) may be configured such that the operations (e.g., an algorithm such as the method described above) used to determine the face volume for individual 1752 changes based on the headform category. For example, for an individual 1752 determined to be in a medium headform category (e.g., determined as described above), the cuts may be as follows: a first cut (Cut A shown in FIG. 17C) approximately 6 cm up from the subnasion landmark on the y-axis (shown in FIG. 17D); a second cut (Cut B shown in FIG. 17C) 4 cm down from the subnasion landmark on the y-axis (shown in FIG. 17D); and a third cut (Cut C shown in FIG. 17C) 5 cm backwards from the subnasion landmark on the z-axis (shown in FIG. 17E). In some embodiments, cuts 1710 at distances 1712, 1714, and 1716 for meshes 1700 for individuals 1704 (shown in FIGS. 17A and B) and/or Cuts A, B, and C (FIGS. 17C, D, and E) at the example distances described above in the small head form category may be approximately 10% shorter than the cuts for the medium headform category, and the cuts 1710 at distances 1712, 1714, and 1716 (shown in FIGS. 17A and B) and/or Cuts A, B, and C (FIGS. 17C, D, and E) at the example distances described above for the large head form category may be approximately 10% longer. In some embodiments, cuts 1710 at distances 1712, 1714, and 1716 (shown in FIGS. 17A and B) and/or Cuts A, B, and C (FIGS. 17C, D, and E) at the example distances described above for the long and narrow headform category may be approximately 15% longer than the cuts for the medium headform category. It should be noted that the reference location, the cut lines, and the distances described in this example are not intended to be limiting. Other possibilities are contemplated. In some embodiments, volume calculations may be performed by an automated computer algorithm and/or by other methods.

In some embodiments, fitting component 808 (FIG. 11) may be configured such that the operations (e.g., an algorithm such as the method described above) used to determine the face volume for the individual 1704, 1752 changes based on the headform category and/or within a given headform category. This may facilitate even more accurate determinations of face volume, and/or have other advantages. For example, the medium headform category encompasses a range of face widths and lengths. The operations (algorithms) used to determine face volume may change based on specific widths and/or lengths within the medium headform category such that for a smaller face end of the medium headform category the cuts 1710 and/or A, B, and C are different than they are for a larger face end of the medium headform category. Two (e.g., smaller and larger) or more such subdivisions may be used. Similar subdivisions in other headform categories are contemplated.

Returning to FIG. 11, fitting component 808 may be configured such that face volume fit criteria varies with headform category. Fitting component 808 may generate a mask fit pass indication responsive to the face volume of an individual satisfying face volume fit criteria for the head form category of the individual; or a mask fit fail indication responsive to the face volume of the individual not satisfying the face volume fit criteria for the head form category of the individual.

In some embodiments, generating the mask fit pass or fail indication comprises determining the different facial volume fit criteria for the different headform categories. Fitting component 808 may be configured to determine the facial volume fit criteria for a given head form category by obtaining at least one fit test three-dimensional (3D) facial image of a plurality of human or human model test subjects in a statistically significant sample size of human or human model test subjects; and converting the fit test facial images of the plurality of human or human model test subjects to numerical fit test data for analysis. The fit test data may be representative of facial features, facial dimensions, and/or facial locations on the faces of the plurality of human or human model test subjects, for example. Head form categories may be determined, based on the numerical fit test data, for the plurality of human or human model test subjects. For those human or human model test subjects with the given head form category, the fit test data may be aggregated to determine the facial volume fit criteria for the head form category. In some embodiments, the facial volume fit criteria may be further subdivided by mask type. Examples of aggregated fit test data and corresponding volume ranges for different headform categories and different mask types (e.g., a filtering facepiece respirator (FFR) mask, a half face elastomeric mask, a full face elastomeric mask, etc.) are shown in Tables 7-10 of Example 2 below.

Tables 7, 8 and 9 show hypothetical data ("collected") and used to determine the ranges of facial volumes for small, medium, and large respirator masks (for example) respectively for corresponding head form categories. Column one in each table shows individual subjects found in each one of the head form categories. Table 7 column two, shows subjects one through five having successful fit tests (via conventional fit testing methods) for a small mask, and columns three and four show a failed fit test for a medium and large respirator mask. Column five shows the facial volume for each subject. The last row of table 7 indicates the range of acceptable facial volume for subjects in the small head form category.

Table 8 shows the same information for subjects in the medium head form category, and Table 9 shows that same information for subjects in the large head form category.

This data y be collected for a statistically valid number of masks (at least one) of every type (i.e. filtering face piece respirator, half-face elastomeric respirator, full-face respirator and any other respirator requiring fit testing), for example. Table 10 shows the data aggregation of three masks in each type of respirator. Other categories of measurement data may be collected and ranges may be determined by using the same or similar methodology and protocol described herein. These categories of measurements ranges may be used to correlate a RUs successful fit test.

In some embodiments, generating the mask fit pass or fail indication comprises obtaining one or more physical parameters and/or one or more demographic parameters for the individual; and generating the mask fit pass or fail indication based on the face volume and a comparison of the one or more physical parameters and/or one or more demographic parameters for the individual to corresponding physical parameter and/or demographic parameter criteria for the head form category. In some embodiments, the mask fit pass or fail indication may be generated based on the face volume, the comparison of the one or more physical parameters and/or one or more demographic parameters for the individual to corresponding physical parameter and/or demographic parameter criteria for the head form category, a comparison of facial dimensions for the individual to corresponding facial dimension criteria for the head form category, and/or other comparisons. In some embodiments, the physical parameters and/or the demographic parameters may be obtained as described herein (e.g., by user information component 800 and/or other components). In some embodiments, the physical parameters comprise height, weight, and/or other physical parameters of the individual. In some embodiments, the demographic parameters comprise age, gender, race, and/or other demographic parameters of the individual.

In some embodiments, generating the mask fit pass or fail indication comprises determining a weighted combination of the face volume, the one or more physical parameters, the one or more demographic parameters, the facial dimensions, and/or other information; and generating, with the one or more processors, the mask fit pass or fail indication based on a comparison of the weighted combination to corresponding weighted fit criteria for the head form category.

An aggregation of weighted categories of measurements may be used to predict successful or unsuccessful fit tests in each head form category. Table C below lists possible weighting ranges for various categories of measurement.

TABLE C

| Category of Measurement | Expected Range of Ratios |
| --- | --- |
| Volumetric | 10-60% |
| Face Dimensions (length, width, etc.) | 30-86% |
| Physical and Demographic Parameters | 0-30% |

Table C is just an example. The exact weighting of the Categories of Measurement used to indicate a pass/fail notification may change over time as additional data is gathered. Also, the weighting may be altered based on gender, race and/or other physical and demographic parameters like body mass index (BMI), weight/height ratio, etc.

After comparing data for an individual against the weighted categories of measurements for the appropriate head form category, the individual may be certified (e.g., responsive to a mask fit pass indication) to wear a manufacturer-, model- and size-specific respirator mask (or other personal protective equipment) which has been recognized to have a successful fit correlation, by size, to a specific headform category (e.g., as described herein). In some embodiments, the mask fit pass indication or the mask fit fail indication is performed for two or more different types of respirator masks using the same numerical data.

In some embodiments, fitting component 808 may be configured such that an individual who fits into a particular headform category who has face volumetric measurements that are less than average, or less than a threshold lower limit, for that category, may be considered to fit (e.g., receive a mask fit pass indication for) a mask (and/or other personal protective equipment) at least one size smaller than a typical mask size for that headform category. In some embodiments, an individual who fits into a particular headform category who has face volumetric measurements that are greater than average, or greater than a threshold upper limit, for that category, may be considered to fit a mask at least one size larger than a typical mask size for that headform category.

As an example, an individual whose facial dimensions put them in a large headform category, who has a facial volume measurement below the range of facial volumes associated with that category may be certified (e.g., receive a mask fit pass indication) to wear a respirator mask normally associated with a smaller headform category (e.g., medium or small). Conversely, an individual whose facial dimensions put them in a medium headform category, who has a facial volume measurement above the range of facial volumes associated with that category may be certified (e.g., receive a mask fit pass indication) to wear a respirator mask normally associated with a larger head form category (e.g., large).

Figure 18:
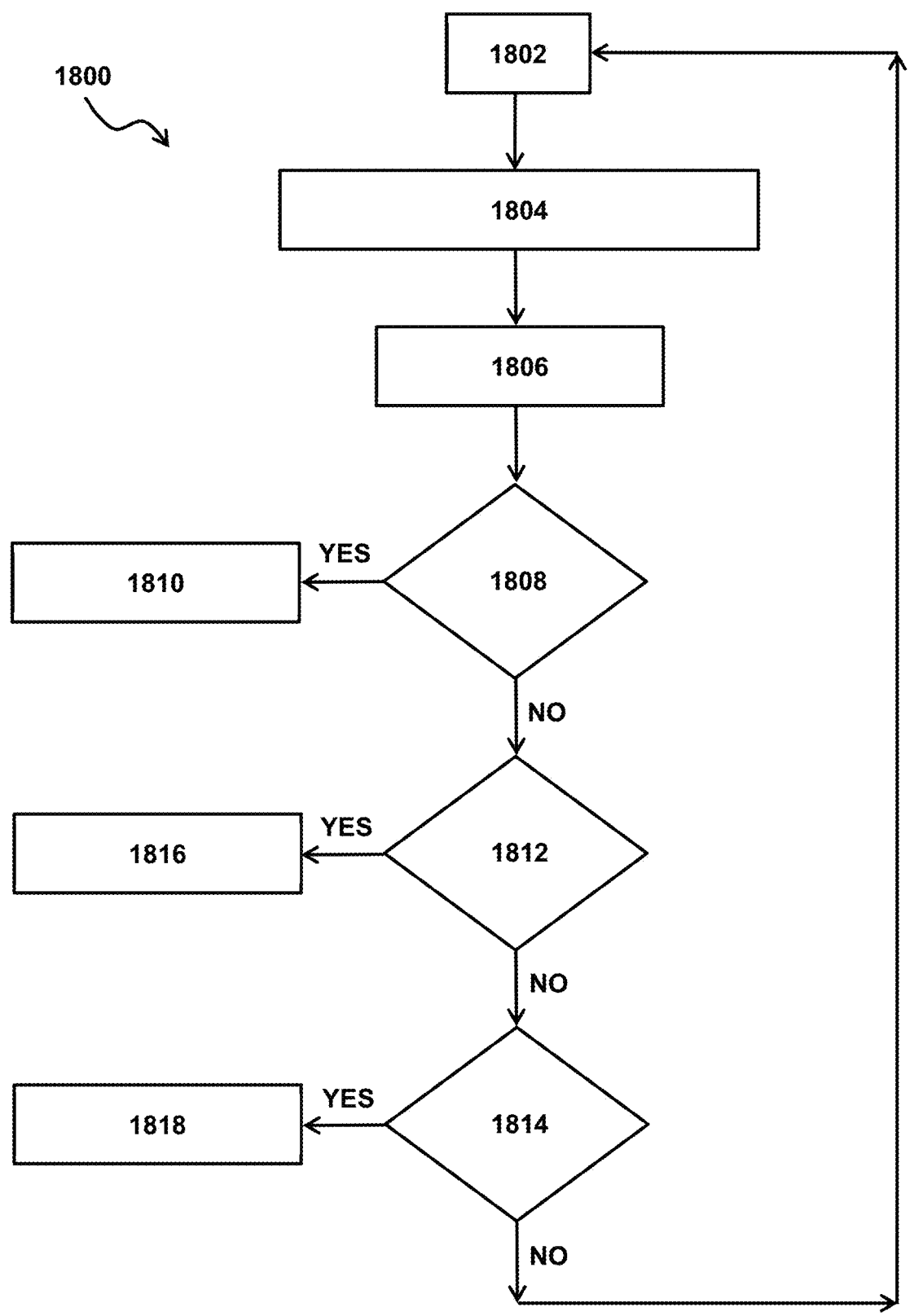
FIG. 18 illustrates an example operational flow for determining a respirator mask (and/or other personal protective equipment) fit based on measurement data from a single time point.

FIG. 18 illustrates an example operational flow 1800 for determining a respirator mask (and/or other personal protective equipment) fit based on measurement data from a single time point according to the operations described above. Flow 1800 depicts an example decision process for an individual in a medium head form category, and the same or similar operational flow may be used for other categories of measurements. Flow 1800 begins with a facial scan 1802 (e.g., at a single point in time). In FIG. 18, the individual is determined 1804 to be in a medium headform category based on the numerical data (e.g., facial measurements) generated from the scan (as described above). The facial volume of the individual is determined 1806 (as described above). The determined facial volume is compared 1808 to corresponding mask fit pass criteria for a medium headform, and responsive to the determined facial volume satisfying the criteria ("Yes"), fitting component 808 (FIG. 11) generates 1810 a mask fit pass indication for a medium sized mask. Responsive to the facial volume not satisfying the pass criteria for the medium headform ("No"), fitting component 808 determines whether the facial volume is less than 1812 or greater than 1814 the pass criteria for the medium headform. If the facial volume is less than the pass criteria for the medium headform ("Yes" after 1812), fitting component 808 generates 1816 a mask fit pass indication for a small sized mask. If the facial volume is greater than the pass criteria for the medium headform ("Yes" after 1814), fitting component 808 generates 1818 a mask fit pass indication for a large sized mask. Flow 1800 may be repeated as necessary. In should be noted that this is just one example flow. Other flows are contemplated.

Returning to FIG. 11, prediction component 810 may be configured to make one or more predictions related to the facial features, facial dimensions, and/or facial locations on the face of the individual represented in the initial visit data and subsequent visit data. For example, in some embodiments, prediction component 810 may be configured to determine one or more rates of change for the corresponding facial features, facial dimensions, and/or facial locations on the face of the individual represented in the initial visit data and subsequent visit data. Prediction component 810 is configured to determine the rates of change based on the differences between the corresponding facial features, facial dimensions, and/or facial locations on the face of the individual represented in the initial visit data and subsequent visit data, and/or other information. In such embodiments, prediction component 810 may be configured to predict an expected failure date when differences between the corresponding facial features, facial dimensions, and/or facial locations on the face of the individual represented in the initial visit data and subsequent visit data will breach the one or more pre-defined ADs. The expected failure date may be predicted based on the one or more pre-defined ADs and the one or more rates of change for the corresponding facial features, facial dimensions, and/or facial locations on the face of the individual represented in the initial visit data and subsequent visit data, and/or other information (e.g., as described above, based on a computed rate at which the 3D facial image data is approaching one or more ADs, an expected failure date can be computed).

In some embodiments, prediction component 810 may be configured to determine relationships between one or more physical parameters of an individual being fitted for a mask and the differences between the corresponding facial features, facial dimensions, and/or facial locations on the face of the individual represented in the initial visit data and subsequent visit data. For example, prediction component 810 may be configured to determine a relationship between a weight of the individual and the differences between the corresponding facial features, facial dimensions, and/or facial locations on the face of the individual represented in the initial visit data and subsequent visit data. In such embodiments, prediction component 810 may be configured to predict, based on the relationship, a degree of weight gain and/or loss by the individual that will cause the differences between the corresponding facial features, facial dimensions, and/or facial locations on the face of the individual represented in data for future visits will breach the one or more pre-defined ADs.

In some embodiments, prediction component 810 may be configured to determine relationships between one or more demographic parameters of an individual being fitted for a mask and the differences between the corresponding facial features, facial dimensions, and/or facial locations on the face of the individual represented in the initial visit data and subsequent visit data. For example, prediction component 810 may be configured to determine a relationship between the age, race, or gender of the individual and the differences between the corresponding facial features, facial dimensions, and/or facial locations on the face of the individual represented in the initial visit data and subsequent visit data. In such embodiments, prediction component 810 may be configured to predict, based on the demographic parameter relationship(s), whether the differences between the corresponding facial features, facial dimensions, and/or facial locations on the face of the individual represented in data for future visits will breach the one or more pre-defined ADs.

In some embodiments, prediction component 810 may be configured to predict or otherwise determine the one or more medical conditions experienced by an individual being fitted for a respirator mask. For example, prediction component 810 may be configured to determine, based on the differences between the corresponding facial features, facial dimensions, and/or facial locations on the face of the individual represented in the initial visit data and subsequent visit data, presence of skin cancer on the face of the individual. As another example, prediction component 810 may be configured to predict or otherwise determine, based on data collected from images of the RUs eyes and/or the differences between the corresponding facial features, facial dimensions, and/or facial locations on the face of the individual represented in the initial visit data and subsequent visit data, the possible presence of heart disease in the individual. As even another example, prediction component 810 may be configured to predict and/or otherwise determine, based on the differences between the corresponding facial features, facial dimensions, and/or facial locations on the face of the individual represented in the initial visit data and subsequent visit data, presence of asymmetric skin migration indicative of a stroke, or Bell's Palsy in the individual.

In some embodiments, prediction component 810 may be configured to predict or recommend a respirator mask manufacturer and/or model for a different individual (e.g., an individual who has not yet begun a typical mask fitting process). Prediction component may be configured to predict or recommend a respirator manufacturer, model and size based on the manufacturers' specifications for each respirator, the initial visit data, the subsequent visit data, and/or the differences between the corresponding facial features, facial dimensions, and/or facial locations on the face of the individual represented in the initial visit data and subsequent visit data. In some embodiments, the recommended respirator mask manufacturer and/or model for the different individual may be predicted based on (1) the initial visit data, the subsequent visit data, and/or the differences between the corresponding facial features, facial dimensions, and/or facial locations on the face of the individual represented in the initial visit data and subsequent visit data; (2) the relationship between a weight of the individual and the differences between the corresponding facial features, facial dimensions, and/or facial locations on the face of the individual represented in the initial visit data and subsequent visit data (e.g., for other individuals with similar weights or weight changes); (3) the relationship between the demographic information of the individual and the differences between the corresponding facial features, facial dimensions, and/or facial locations on the face of the individual represented in the initial visit data and subsequent visit data (e.g., for individuals with similar demographics), and/or other information.

In some embodiments, prediction component 810 may be configured such that making one or more predictions related to the facial features, facial dimensions, and/or facial locations on the face of the individual represented in the initial visit data and subsequent visit data comprises causing one or more machine-learning models to be trained using the initial visit data and subsequent visit data, the information obtained by user information component 800, and/or other information. In some embodiments, the machine-learning model is trained based on the initial visit data and subsequent visit data by providing the initial visit data and subsequent visit data as input to the machine-learning model. In some embodiments, the machine-learning model may be and/or include mathematical equations, algorithms, plots, charts, networks (e.g., neural networks), and/or other tools and machine-learning model components. For example, the machine-learning model may be and/or include one or more neural networks having an input layer, an output layer, and one or more intermediate or hidden layers. In some embodiments, the one or more neural networks may be and/or include deep neural networks (e.g., neural networks that have one or more intermediate or hidden layers between the input and output layers).

As an example, neural networks may be based on a large collection of neural units (or artificial neurons). Neural networks may loosely mimic the manner in which a biological brain works (e.g., via large clusters of biological neurons connected by axons). Each neural unit of a neural network may be connected with many other neural units of the neural network. Such connections can be enforcing or inhibitory in their effect on the activation state of connected neural units. In some embodiments, each individual neural unit may have a summation function that combines the values of all its inputs together. In some embodiments, each connection (or the neural unit itself) may have a threshold function such that a signal must surpass the threshold before it is allowed to propagate to other neural units. These neural network systems may be self-learning and trained, rather than explicitly programmed, and can perform significantly better in certain areas of problem solving, as compared to traditional computer programs. In some embodiments, neural networks may include multiple layers (e.g., where a signal path traverses from front layers to back layers). In some embodiments, back propagation techniques may be utilized by the neural networks, where forward stimulation is used to reset weights on the "front" neural units. In some embodiments, stimulation and inhibition for neural networks may be more free flowing, with connections interacting in a more chaotic and complex fashion.

For example, prediction component 810 may be configured such that a trained neural network is caused to indicate the expected failure date the one or more pre-defined ADs will be breached (e.g., based on the rates of change described above); the degree of weight gain and/or loss by the individual that will cause breach of the one or more pre-defined ADs; whether the individual has heart disease, asymmetric skin migration indicative of stroke, or Bell's Palsy; the recommended mask manufacturer and/or model; and/or other information.

In some embodiments, the operations performed by the components described above may be repeated for subsequent mask fitting visits. For example, fitting component 808 may compare data for a series of mask fitting visits (e.g., data from VISIT X is compared to VISIT X+1, and/or VISIT X+2, . . . and/or VISIT X+n). In some embodiments, the operations performed by the components described above may be performed for an immediately prior visit (e.g., not necessarily an initial visit) and/or one or more subsequent visits. For example, fitting component 808 may compare data for any two or more visits in a series of mask fitting visits (e.g., data from any of VISIT X, VISIT X+1, VISIT X+2, . . . and/or VISIT X+n may be compared to any other one of VISIT X+1, VISIT X+2, . . . and/or VISIT X+n that occurs subsequent in time). One of ordinary skill in the art will understand that other variations are possible and this example is not limited to fitting component 808 only.

The reader should appreciate that the present application describes several inventions. Rather than separating those inventions into multiple isolated patent applications, applicants have grouped these inventions into a single document because their related subject matter lends itself to economies in the application process. However, the distinct advantages and aspects of such inventions should not be conflated. In some cases, embodiments address all of the deficiencies noted herein, but it should be understood that the inventions are independently useful, and some embodiments address only a subset of such problems or offer other, unmentioned benefits that will be apparent to those of skill in the art reviewing the present disclosure. Due to cost constraints, some inventions disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such inventions or all aspects of such inventions.

Any embodiment, or features of an embodiment, described herein may be used in combination with any other embodiment, or features of another embodiment. For example, features of the two time point allowable delta version of the system may be used together with features of the single time fit determination It should be understood that the description and the drawings are not intended to limit the invention to the particular form disclosed, but to the contrary, the intention is to cover all modifications, equivalents, and alternatives falling within the spirit and scope of the present invention as defined by the appended claims. Further modifications and alternative embodiments of various aspects of the invention will be apparent to those skilled in the art in view of this description. Accordingly, this description and the drawings are to be construed as illustrative only and are for teaching those skilled in the art the general manner of carrying out the invention. It is to be understood that the forms of the invention shown and described herein are to be taken as examples of embodiments. Elements and materials may be substituted for those illustrated and described herein, parts and processes may be reversed or omitted, and certain features of the invention may be utilized independently, all as would be apparent to one skilled in the art after having the benefit of this description of the invention. Changes may be made in the elements described herein without departing from the spirit and scope of the invention as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

The present techniques will be better understood with reference to the following enumerated embodiments:

1. A method for performing automated respirator mask fit testing, the method comprising: obtaining at least one initial three-dimensional (3D) facial image of an individual from an initial respirator mask fitting visit; obtaining at least one current 3D facial image of the individual from a subsequent respirator mask fitting visit; converting the initial facial image and the current facial image to numerical initial visit data and subsequent visit data for analysis, the initial visit data and the subsequent visit data representative of facial features, facial dimensions, and/or facial locations on the face of the individual; identifying facial reference points in the initial visit data and the subsequent visit data; determining whether the facial reference points in the initial visit data and the subsequent visit data meet alignment criteria; and responsive to a determination that the facial reference points in the initial visit data and the subsequent visit data meet the alignment criteria: determining, based on the initial visit data and subsequent visit data, whether differences between corresponding facial features, facial dimensions, and/or facial locations on the face of the individual represented in the initial visit data and subsequent visit data breach one or more pre-defined allowable deltas (ADs); and generating a mask fit pass indication responsive to differences between the corresponding facial features, facial dimensions, and/or facial locations on the face of the individual represented in the initial visit data and subsequent visit data not breaching the one or more pre-defined ADs; or generating a mask fit fail indication responsive to differences between the corresponding facial features, facial dimensions, and/or facial locations on the face of the individual represented in the initial visit data and subsequent visit data breaching the one or more pre-defined ADs.

2. The method of embodiment 1, further comprising determining, based on the differences between the corresponding facial features, facial dimensions, and/or facial locations on the face of the individual represented in the initial visit data and subsequent visit data, one or more rates of change for the corresponding facial features, facial dimensions, and/or facial locations on the face of the individual represented in the initial visit data and subsequent visit data.

3. The method of embodiment 2, further comprising predicting, based on the one or more pre-defined ADs and the one or more rates of change for the corresponding facial features, facial dimensions, and/or facial locations on the face of the individual represented in the initial visit data and subsequent visit data, an expected failure date when differences between the corresponding facial features, facial dimensions, and/or facial locations on the face of the individual represented in the initial visit data and subsequent visit data will breach the one or more pre-defined ADs.

4. The method of any one of embodiments 1-3, further comprising obtaining weight information for the individual at the initial respirator mask fitting visit and the subsequent respirator mask fitting visit; determining a relationship between a weight of the individual and the differences between the corresponding facial features, facial dimensions, and/or facial locations on the face of the individual represented in the initial visit data and subsequent visit data; and predicting, based on the relationship, a degree of weight gain and/or loss by the individual that will cause the differences between the corresponding facial features, facial dimensions, and/or facial locations on the face of the individual represented in the initial visit data and subsequent visit data to breach the one or more pre-defined ADs.

5. The method of any one of embodiments 1-4, further comprising categorizing the face of the individual into a NIOSH Headform Category based on the initial visit data, the subsequent visit data, and/or the differences between the corresponding facial features, facial dimensions, and/or facial locations on the face of the individual represented in the initial visit data and subsequent visit data; and determining the one or more pre-defined ADs based on the categorized NIOSH Headform Category.

6. The method of embodiment 5, wherein NIOSH Headform Categories include small, medium, large, long/narrow, and short/wide.

7. The method of any of embodiments 1-6, further comprising determining a recommended respirator mask manufacturer and/or model for the individual based on the initial visit data, the subsequent visit data, and/or the differences between the corresponding facial features, facial dimensions, and/or facial locations on the face of the individual represented in the initial visit data and subsequent visit data.

8. The method of any of embodiments 1-7, further comprising obtaining demographic information for the individual at the initial respirator mask fitting visit and/or the subsequent respirator mask fitting visit, the demographic information comprising one or more of geographical information about a location of the individual, racial information about the individual, information about a gender of the individual, information about an industry where the individual works, or public health information related to the industry where the individual works.

9. The method of embodiment 8, further comprising determining a relationship between the demographic information of the individual and the differences between the corresponding facial features, facial dimensions, and/or facial locations on the face of the individual represented in the initial visit data and subsequent visit data; and predicting based on the relationship, whether the differences between the corresponding facial features, facial dimensions, and/or facial locations on the face of the individual represented in future visit data will breach the one or more pre-defined ADs.

10. The method of any of embodiments 1-9, further comprising determining based on the differences between the corresponding facial features, facial dimensions, and/or facial locations on the face of the individual represented in the initial visit data and subsequent visit data, presence of a temporary facial blemish; and adjusting based on the determination of the presence of a facial blemish, the determination of whether the differences between the corresponding facial features, facial dimensions, and/or facial locations on the face of the individual represented in the initial visit data and subsequent visit data breach the one or more pre-defined ADs.

11. The method of any of embodiments 1-10, further comprising determining, based on the differences between the corresponding facial features, facial dimensions, and/or facial locations on the face of the individual represented in the initial visit data and subsequent visit data, presence of skin cancer on the face of the individual.

12. The method of any of embodiments 1-11, further comprising determining, based on the differences between the corresponding facial features, facial dimensions, and/or facial locations on the face of the individual represented in the initial visit data and subsequent visit data, presence of heart disease in the individual.

13. The method of any of embodiments 1-12, further comprising determining, based on the differences between the corresponding facial features, facial dimensions, and/or facial locations on the face of the individual represented in the initial visit data and subsequent visit data, presence of asymmetric skin migration indicative of a stroke or Bell's Palsy in the individual.

14. The method of any of embodiments 1-13, further comprising determining a recommended respirator mask manufacturer and/or model for a different individual based on the initial visit data, the subsequent visit data, and/or the differences between the corresponding facial features, facial dimensions, and/or facial locations on the face of the individual represented in the initial visit data and subsequent visit data.

15. The method of any of embodiments 1-14, further comprising obtaining weight information for the individual at the initial respirator mask fitting visit and the subsequent respirator mask fitting visit; determining a relationship between a weight of the individual and the differences between the corresponding facial features, facial dimensions, and/or facial locations on the face of the individual represented in the initial visit data and subsequent visit data; obtaining demographic information for the individual at the initial respirator mask fitting visit and/or the subsequent respirator mask fitting visit, the demographic information comprising one or more of geographical information about a location of the individual, racial information about the individual, information about a gender of the individual, information about an industry where the individual works, or public health information related to the industry where the individual works; determining, a relationship between the demographic information of the individual and the differences between the corresponding facial features, facial dimensions, and/or facial locations on the face of the individual represented in the initial visit data and subsequent visit data; and determining the recommended respirator mask manufacturer and/or model for the different individual based on (1) the initial visit data, the subsequent visit data, and/or the differences between the corresponding facial features, facial dimensions, and/or facial locations on the face of the individual represented in the initial visit data and subsequent visit data; (2) the relationship between a weight of the individual and the differences between the corresponding facial features, facial dimensions, and/or facial locations on the face of the individual represented in the initial visit data and subsequent visit data; and (3) the relationship between the demographic information of the individual and the differences between the corresponding facial features, facial dimensions, and/or facial locations on the face of the individual represented in the initial visit data and subsequent visit data.

16. The method of any of embodiments 1-15, wherein determining, based on the initial visit data and subsequent visit data, whether differences between corresponding facial features, facial dimensions, and/or facial locations on the face of the individual represented in the initial visit data and subsequent visit data breach one or more pre-defined ADs comprises comparing a plurality of facial features, facial dimensions, and/or facial locations on the face of the individual represented in the initial visit data and subsequent visit data to corresponding ADs for individual facial features, facial dimensions, and/or facial locations.

17. The method of any of embodiments 1-16, wherein determining whether differences between corresponding facial features, facial dimensions, and/or facial locations on the face of the individual represented in the initial visit data and subsequent visit data breach one or more of the pre-defined ADs comprises determining a weighted combination of the comparisons of the plurality of facial features, facial dimensions, and/or facial locations on the face of the individual represented in the initial visit data and subsequent visit data to the corresponding ADs for the individual facial features, facial dimensions, and/or facial locations.

18. The method of any of embodiments 1-17, wherein the initial visit data and subsequent visit data each comprise millions of individual data points, and determining whether differences between corresponding facial features, facial dimensions, and/or facial locations on the face of the individual represented in the initial visit data and subsequent visit data breach the one or more pre-defined ADs comprises comparing individual data points in the initial visit data to corresponding individual data points in the subsequent visit data.

19. The method of any of embodiments 1-18, wherein determining whether differences between corresponding facial features, facial dimensions, and/or facial locations on the face of the individual represented in the initial visit data and subsequent visit data breach one or more of the pre-defined ADs comprises determining at least one initial facial volume and at least one subsequent facial volume of the face of the individual represented in the initial visit data and subsequent visit data and comparing a difference between the at least one subsequent facial volume and the at least one initial facial volume to a corresponding AD for facial volume.

20. The method of any of embodiments 1-19, wherein determining whether differences between corresponding facial features, facial dimensions, and/or facial locations on the face of the individual represented in the initial visit data and subsequent visit data breach one or more of the pre-defined ADs comprises determining at least one initial facial area and at least one subsequent facial area of the face of the individual represented in the initial visit data and subsequent visit data and comparing a difference between the at least one subsequent facial area and the at least one initial facial area to a corresponding AD for facial area.

21. The method of any of embodiments, 1-20, wherein determining whether differences between corresponding facial features, facial dimensions, and/or facial locations on the face of the individual represented in the initial visit data and subsequent visit data breach one or more of the pre-defined ADs comprises determining at least one initial facial point to point distance and at least one subsequent facial point to point distance of the face of the individual represented in the initial visit data and subsequent visit data and comparing a difference between the at least one subsequent facial point to point distance and the at least one initial facial point to point distance to a corresponding AD for facial point to point distance.

22. The method of any of embodiments 1-21, further comprising determining the one or more pre-defined ADs by: obtaining at least one first fit test two-dimensional (2D) or three-dimensional (3D) facial image of a plurality of human or human model test subjects in a statistically significant sample size of human or human model test subjects; obtaining at least one second fit test two-dimensional (2D) or three-dimensional (3D) facial image of the plurality of human or human model test subjects in the statistically significant sample size of human or human model test subjects, wherein faces of the plurality of human or human model test subjects are changed between the first fit test and the second fit test converting the first and second fit test facial images of the plurality of human or human model test subjects to numerical first and second fit test data for analysis, the first and second fit test data representative of facial features, facial dimensions, and/or facial locations on the faces of the plurality of human or human model test subjects; and for those human or human model test subjects in the plurality of human or human model test subjects who experience a change event between the first and second fit test, aggregating the first and second fit test data to determine the one or more pre-defined ADs for the facial features, facial dimensions, and/or facial locations on the faces of the plurality of human or human model test subjects.

23. The method of embodiment 22, wherein a change event comprises an even after which a human or human model test subject can no longer be successfully fit tested at the second fit test to a respirator mask used in the first fit test using conventional fit test methods.

24. The method of embodiment 22 or 23, wherein aggregating the first and second fit test data to determine the one or more pre-defined ADs comprises determining averages and standard deviations of differences in measurements represented by the numerical first and second fit test data corresponding to the facial features, facial dimensions, and/or facial locations on the faces of the plurality of human or human model test subjects, and determining the one or more pre-defined ADs based on the averages and standard deviations of the differences.

25. The method of any of embodiments 22-24, further comprising validating the one or more pre-defined ADs with fit test data for a plurality of actual respirator users (RU) who experience a change event between fit tests.

26. The method of any of embodiments 1-25, wherein generating the mask fit pass indication responsive to differences between the corresponding facial features, facial dimensions, and/or facial locations on the face of the individual represented in the initial visit data and subsequent visit data not breaching the one or more pre-defined ADs; or generating the mask fit fail indication responsive to differences between the corresponding facial features, facial dimensions, and/or facial locations on the face of the individual represented in the initial visit data and subsequent visit data breaching the one or more pre-defined ADs is performed for two or more different types of respirator masks using the same initial visit data and subsequent visit data.

27. A tangible, non-transitory, machine-readable medium storing instructions that when executed effectuate operations including: the method of any one of embodiments 1-25.

28. A system comprising one or more processors and memory storing instructions that when executed by the processors cause the processors to effectuate operations comprising: using the method of any one of embodiments 1-25.

29. A method for performing automated respirator mask fit testing, the method comprising: obtaining, with one or more processors, at least one three-dimensional (3D) facial image of an individual; converting, with the one or more processors, the facial image to numerical data for analysis, the numerical data representative of facial features, facial dimensions, and/or facial locations on the face of the individual; determining, with the one or more processors, based on the numerical data, a head form category for the individual; determining, with the one or more processors, based on the head form category and the numerical data, a face volume for the individual; and generating, with the one or more processors, a mask fit pass indication responsive to the face volume satisfying face volume fit criteria for the head form category; or generating, with the one or more processors, a mask fit fail indication responsive to the face volume not satisfying the face volume fit criteria for the head form category.

30. The method of embodiment 29, further comprising: obtaining, with the one or more processors, one or more physical parameters and/or one or more demographic parameters for the individual; and generating, with the one or more processors, the mask fit pass or fail indication based on the face volume and a comparison of the one or more physical parameters and/or one or more demographic parameters for the individual to corresponding physical parameter and/or demographic parameter criteria for the head form category.

31. The method of embodiment 30, further comprising: determining, with the one or more processors, a weighted combination of the face volume, the one or more physical parameters, and the one or more demographic parameters; and generating, with the one or more processors, the mask fit pass or fail indication based on a comparison of the weighted combination to corresponding weighted fit criteria for the head form category.

32. The method of any of embodiments 30 or 31, wherein the one or more physical parameters comprise one or both of a height and a weight of the individual.

33. The method of any of embodiments 30-32, wherein the one or more demographic parameters comprise one or more of an age, a gender, and a race of the individual.

34. The method of any of embodiments 29-33, wherein the one or more processors are configured such that the head form category comprises a NIOSH Head form Category, wherein NIOSH Head form Categories include small, medium, large, long/narrow, and short/wide.

35. The method of any of embodiments 29-34, further comprising determining, with the one or more processors, a recommended respirator mask manufacturer and/or model for the individual based on the head form category, the numerical data, the face volume for the individual.

36. The method of any of embodiments 29-35, wherein determining, with the one or more processors, based on the numerical data, the head form category for the individual, comprises: determining a face length and a face width of the individual; and determining the head form category based on the face length and the face width.

37. The method of any of embodiments 29-36, further comprising determining the facial volume fit criteria for the head form category by: obtaining, with the one or more processors, at least one fit test three-dimensional (3D) facial image of a plurality of human or human model test subjects in a statistically significant sample size of human or human model test subjects; converting, with the one or more processors, the fit test facial images of the plurality of human or human model test subjects to numerical fit test data for analysis, the fit test data representative of facial features, facial dimensions, and/or facial locations on the faces of the plurality of human or human model test subjects; determining, with the one or more processors, based on the numerical fit test data, head form categories for the plurality of human or human model test subjects; and for those human or human model test subjects with the head form category, aggregating, with the one or more processors, the fit test data to determine the facial volume fit criteria for the head form category.

38. The method of any of embodiments 29-37, wherein generating, with the one or more processors, the mask fit pass indication or the mask fit fail indication is performed for two or more different types of respirator masks using the same numerical data.

39. The method of any of embodiments 29-38, wherein the one or more processors are configured such that an algorithm used to determine the face volume for the individual changes based on the head form category.

40. The method of any of embodiments 29-39, wherein the one or more processors are configured to determine the face volume by: generating a mesh that represents the face of the individual based on the at least one three-dimensional (3D) facial image and/or the numerical data; identifying a reference location in the mesh corresponding to a specific location on the face of the individual; cutting the mesh at one or more target distances from the reference location; and determining the face volume for an area of the face defined by the cut mesh.

41. A tangible, non-transitory, machine-readable medium storing instructions that when executed effectuate operations including: obtaining at least one three-dimensional (3D) facial image of an individual; converting the facial image to numerical data for analysis, the numerical data representative of facial features, facial dimensions, and/or facial locations on the face of the individual; determining, based on the numerical data, a head form category for the individual; determining, based on the head form category and the numerical data, a face volume for the individual; and generating a mask fit pass indication responsive to the face volume satisfying face volume fit criteria for the head form category; or generating a mask fit fail indication responsive to the face volume not satisfying the face volume fit criteria for the head form category.

42. A system comprising one or more processors and memory storing instructions that when executed by the processors cause the processors to effectuate operations comprising: obtaining at least one three-dimensional (3D) facial image of an individual; converting the facial image to numerical data for analysis, the numerical data representative of facial features, facial dimensions, and/or facial locations on the face of the individual; determining, based on the numerical data, a head form category for the individual; determining, based on the head form category and the numerical data, a face volume for the individual; and generating a mask fit pass indication responsive to the face volume satisfying face volume fit criteria for the head form category; or generating a mask fit fail indication responsive to the face volume not satisfying the face volume fit criteria for the head form category.

43. A method for performing automated personal protective equipment fit testing, the method comprising: obtaining, with one or more processors, at least one three-dimensional (3D) image of at least a portion of an individual; converting, with the one or more processors, the image to numerical data for analysis, the numerical data representative of bodily features, bodily dimensions, and/or bodily locations on the body of the individual; determining, with the one or more processors, based on the numerical data, a body part category for the portion of the individual; determining, with the one or more processors, based on the body part category and the numerical data, a body part volume for the individual; and generating, with the one or more processors, a personal protective equipment pass indication responsive to the body part volume satisfying body part volume fit criteria for the body part category; or generating, with the one or more processors, a personal protective equipment fail indication responsive to the body part volume not satisfying the body part volume fit criteria for the body part category.

44. The method of embodiment 43, wherein the personal protective equipment comprises a respirator mask, industrial head protection equipment, eye and face protection equipment, hand protection equipment, or clothing; and wherein the portion of the individual comprise a corresponding one of a head, a face, a hand, a torso, legs, or feet of the individual.

EXAMPLE 1

TABLE 1

Virtual Cube, External Section Volume

| SUBJECT 001 | Volume 1 | Volume 2 | Volume 3 |
|---|---|---|---|
| VISIT X | 162.8 cm$^3$ | 162.3 cm$^3$ | 110.1 cm$^3$ |
| VISIT X + 1 | 177.1 cm$^3$ | 177.3 cm$^3$ | 119.82 cm$^3$ |
| VISIT X + 2 | 187.1 cm$^3$ | 187.4 cm$^3$ | 129.1 cm$^3$ |
| VISIT X + 3* | 194.2 cm$^3$ | 194.6 cm$^3$ | 133.2 cm$^3$ |
| (Delta Value) | (19.28%) | (19.9%) | (20.98%) |

*indicates a change event

TABLE 2

Population's Delta Values (Volume)

| POPULATION | Volume 1 Delta Values | Volume 2 Delta Values | Volume 3 Delta Values |
|---|---|---|---|
| Subject 001 | 19.28% | 19.9% | 20.98% |
| Subject 002 | 19.22% | 19.44% | 20.22% |
| Subject 003 | 20.01% | 20.01% | 20.56% |
| Subject 004 | 19.02% | 19.11% | 20.03% |
| Subject 005 | 19.33% | 19.33% | 19.87% |
| Subject 006 | 20.22% | 20.22% | 19.55% |
| Subject 007 | 20.04% | 20.45% | 20.04% |
| Subject 008 | 19.99% | 19.34% | 21.01% |
| Subject 009 | 19.44% | 19.67% | 20.22% |
| Subject 010 | 19.55% | 19.55% | 20.88% |
| MEAN DELTA | 19.61% | 19.7% | 20.34% |
| STANDARD DEVIATION | .4192 | .4313 | .5009 |
| ALLOWABLE DELTAS (VOLUME) | 20.45% | 20.56% | 21.34% |

TABLE 3

Surface Area

| SUBJECT 001 | Area 1 | Area 2 | Area 3 | Area 4 |
|---|---|---|---|---|
| VISIT X | 56 cm$^2$ | 54 cm$^2$ | 51 cm$^2$ | 53.2 cm$^2$ |
| VISIT X + 1 | 55.07 cm$^2$ | 53.1 cm$^2$ | 50.2 cm$^2$ | 52.7 cm$^2$ |
| VISIT X + 2 | 55 cm$^2$ | 53.04 cm$^2$ | 50.1 cm$^2$ | 52 cm$^2$ |
| VISIT X + 3* | 54.2 cm$^2$ | 52.25 cm$^2$ | 49.2 cm$^2$ | 51.7 cm$^2$ |
| (Delta Value) | (3.2%) | (3.2%) | (3.5%) | (2.8%) |

*indicates a change event

TABLE 4

Populations Delta Values (Surface Area)

| POPULATION | Surface Area 1 Delta Values | Surface Area 2 Delta Values | Surface Area 3 Delta Values | Surface Area 4 Delta Values |
|---|---|---|---|---|
| Subject 001 | 3.2% | 3.2% | 3.5% | 2.8% |
| Subject 002 | 2.6% | 3.4% | 3.5% | 3.3% |
| Subject 003 | 2.0% | 2.5% | 2.6% | 2.7% |
| Subject 004 | 3.4% | 2.8% | 2.4% | 2.6% |
| Subject 005 | 2.5% | 2.7% | 2.0% | 3.4% |
| Subject 006 | 2.7% | 3.5% | 3.3% | 3.3% |
| Subject 007 | 3.3% | 2.4% | 2.6% | 2.6% |
| Subject 008 | 2.9% | 2.4% | 2.4% | 3.4% |
| Subject 009 | 2.8% | 2.5% | 2.6% | 3.5% |
| Subject 010 | 3.7% | 3.3% | 3.2% | 2.4% |
| MEAN DELTA | 2.51% | 2.48% | 2.38% | 3.45% |
| STANDARD DEVIATION | .499 | .461 | .454 | .416 |
| ALLOWABLE DELTAS (SURFACE AREA) | 3.01% | 2.94% | 2.75% | 3.87% |

TABLE 5

Point-to-Point Distances (PTP)

| SUBJECT 001 | PTP 1 | PTP 2 | PTP 3 | PTP 4 | PTP 5 | PTP 6 | PTP 7 | PTP 8 |
|---|---|---|---|---|---|---|---|---|
| VISIT X | 5.5 mm | 5.3 mm | 5.0 mm | 5.2 mm | 5.6 mm | 5.3 mm | 5.0 mm | 5.3 mm |
| VISIT X + 1 | 5.7 mm | 5.3 mm | 5.2 mm | 5.7 mm | 5.7 mm | 5.4 mm | 5.22 mm | 5.7 mm |
| VISIT X + 2 | 6 mm | 5.4 mm | 5.5 mm | 5.9 mm | 6.1 mm | 5.4 mm | 5.88 mm | 6.0 mm |
| VISIT X + 3* | 6.2 mm | 5.5 mm | 5.8 mm | 5.9 mm | 6.2 mm | 5.7 mm | 5.9 mm | 6.1 mm |
| (Delta Value) | (12.7%) | (3.7%) | (16%) | (13.5%) | (10.7%) | (7.5%) | (18%) | (15.1%) |

*indicates a change event

TABLE 6

Population's Delta Values (Point-to-Point)

| POPULATION | PTP 1 Delta Values | PTP 2 Delta Values | PTP 3 Delta Values | PTP 4 Delta Values | PTP 5 Delta Values | PTP 6 Delta Values | PTP 7 Delta Values | PTP 8 Delta Values |
|---|---|---|---|---|---|---|---|---|
| Subject 001 | 12.7% | 3.7% | 16% | 13.5% | 10.7% | 7.5% | 17% | 15.1% |
| Subject 002 | 13.7% | 3% | 15.3% | 13.7% | 10.6% | 7.4% | 15% | 13.4% |
| Subject 003 | 12% | 2.4% | 16.4% | 17% | 10.0% | 7.5% | 16.6% | 17.6% |
| Subject 004 | 11.9% | 3.4% | 14.5% | 16.6% | 11.4% | 6.8% | 14% | 16% |
| Subject 005 | 12% | 4% | 10% | 14.4% | 10.5% | 6.7% | 10.6% | 14.3% |
| Subject 006 | 14% | 3.3% | 13.1% | 13% | 11.7% | 7.5% | 13.5% | 13% |
| Subject 007 | 10.9% | 3.7% | 16% | 16% | 11% | 7.4% | 16% | 16.8% |
| Subject 008 | 12.1% | 3.1% | 14.3% | 14.5% | 10% | 7.4% | 14% | 14.4% |
| Subject 009 | 11.8% | 2.8% | 16.3% | 15.5% | 11.1% | 6.5% | 16.3% | 15% |
| Subject 010 | 12% | 3.7% | 12% | 14.2% | 10% | 6.3% | 12.2% | 14.1% |
| MEAN DELTA | 12.3% | 3.3% | 14.4% | 14.8% | 10.7% | 7.1% | 14.5% | 15.0% |
| STANDARD DEVIATION | .924 | .16 | 2.18 | 1.34 | .60 | .49 | 1.94 | 1.46 |
| ALLOWABLE DELTAS (POINT-TO-POINT) | 13.22% | 3.46% | 16.58% | 16.14% | 11.3% | 7.59% | 16.44% | 16.46% |

EXAMPLE 2

TABLE 7

FFR MASK 1 - Small

| 1. SMALL HEAD FORM SUBJECT | 2. Small | 3. Medium | 4. Large | 5. Facial Volume (cm³) |
|---|---|---|---|---|
| 001 | PASS | FAIL | FAIL | 1151 cm³ |
| 002 | PASS | FAIL | FAIL | 1288 cm³ |
| 003 | PASS | FAIL | FAIL | 1265 cm³ |
| 004 | PASS | FAIL | FAIL | 1187 cm³ |
| 005 | PASS | FAIL | FAIL | 1303 cm³ |
| Range | | | | 1151 cm³-1303 cm³ |

TABLE 8

FFR MASK 1 - Medium

| 1. MEDIUM HEAD FORM SUBJECT | 2. Small | 3. Medium | 4. Large | 5. Facial Volume (cm³) |
|---|---|---|---|---|
| 006 | FAIL | PASS | FAIL | 1354 cm³ |
| 007 | FAIL | PASS | FAIL | 1388 cm³ |
| 008 | FAIL | PASS | FAIL | 1465 cm³ |
| 009 | FAIL | PASS | FAIL | 1487 cm³ |
| 010 | FAIL | PASS | FAIL | 1528 cm³ |
| Range | | | | 1354 cm³-1528 cm³ |

TABLE 9

FFR MASK 1 - Large

| 1. LARGE HEAD FORM SUBJECT | 2. Small | 3. Medium | 4. Large | 5. Facial Volume (cm³) |
|---|---|---|---|---|
| 011 | FAIL | FAIL | PASS | 1554 |
| 012 | FAIL | FAIL | PASS | 1688 |
| 013 | FAIL | FAIL | PASS | 1665 |
| 014 | FAIL | FAIL | PASS | 1707 |
| 015 | FAIL | FAIL | PASS | 1728 |
| Range | | | | 1554 cm³-1728 cm³ |

TABLE 10

Category of measurement data collection and range calculation

| | Small | Medium | Large |
|---|---|---|---|
| FFR Masks | | | |
| Mask 1 | 1151 cm³-1303 cm³ | 1354 cm³-1528 cm³ | 1554 cm³-1728 cm³ |
| Mask 2 | 1148 cm³-1305 cm³ | 1348 cm³-1525 cm³ | 1549 cm³-1722 cm³ |
| Mask 3 | 1152 cm³-1310 cm³ | 1352 cm³-1530 cm³ | 1554 cm³-1720 cm³ |
| Range Limits | 1150.3 cm³-1306.0 cm³ | 1351.3 cm³-1527.7 cm³ | 1552.3 cm³-1723.3 cm³ |
| Half-face Elastomeric Masks | | | |
| Mask 4 | 1144 cm³-1300 cm³ | 1352 cm³-1529 cm³ | 1554 cm³-1721 cm³ |
| Mask 5 | 1140 cm³-1301 cm³ | 1350 cm³-1522 cm³ | 1555 cm³-1724 cm³ |
| Mask 6 | 1151 cm³-1313 cm³ | 1358 cm³-1530 cm³ | 1551 cm³-1727 cm³ |
| Range Limits | 1145.0 cm³-1304.3 cm³ | 1353.3 cm³-1527.0 cm³ | 1553.3 cm³-1724.0 cm³ |
| Full-face Elastomeric Masks | | | |
| Mask 7 | 1151 cm³-1311 cm³ | 1354 cm³-1520 cm³ | 1554 cm³-1722 cm³ |
| Mask 8 | 1148 cm³-1303 cm³ | 1348 cm³-1527 cm³ | 1549 cm³-1722 cm³ |
| Mask 9 | 1149 cm³-1310 cm³ | 1352 cm³-1528 cm³ | 1554 cm³-1727 cm³ |
| Range Limits | 1148.0 cm³-1308.0 cm³ | 1351.3 cm³-1525.0 cm³ | 1552.3 cm³-1723.7 cm³ |

What is claimed is:

1. A method for performing automated respirator mask fit testing, the method comprising:
   obtaining, with one or more processors, at least one three-dimensional (3D) facial image of an individual;
   converting, with the one or more processors, the at least one three-dimensional (3D) facial image to numerical data for analysis, the numerical data representative of facial features, facial dimensions, and/or facial locations on a face of the individual;
   determining, with the one or more processors, based on the numerical data, a head form category for the individual;
   determining, with the one or more processors, based on the head form category and the numerical data, a face volume for the individual; and
   generating, with the one or more processors, a mask fit pass indication responsive to the face volume satisfying face volume fit criteria for the head form category; or generating, with the one or more processors, a mask fit fail indication responsive to the face volume not satisfying the face volume fit criteria for the head form category;

wherein the one or more processors are configured to determine the face volume by:

generating a mesh that represents the face of the individual based on the at least one three-dimensional (3D) facial image and/or the numerical data;

identifying a reference location in the mesh corresponding to a specific location on the face of the individual;

cutting the mesh at one or more target distances from the reference location; and determining the face volume for an area of the face defined by the cut mesh.

2. The method of claim 1, further comprising:

obtaining, with the one or more processors, one or more physical parameters and/or one or more demographic parameters for the individual; and generating, with the one or more processors, the mask fit pass or fail indication based on the face volume and a comparison of the one or more physical parameters and/or one or more demographic parameters for the individual to corresponding physical parameter and/or demographic parameter criteria for the head form category.

3. The method of claim 2, further comprising:

determining, with the one or more processors, a weighted combination of the face volume, the one or more physical parameters, and the one or more demographic parameters; and generating, with the one or more processors, the mask fit pass or fail indication based on a comparison of the weighted combination to corresponding weighted fit criteria for the head form category.

4. The method of claim 2, wherein the one or more physical parameters comprise one or both of a height and a weight of the individual.

5. The method of claim 2, wherein the one or more demographic parameters comprise one or more of an age, a gender, and a race of the individual.

6. The method of claim 1, wherein the one or more processors are configured such that the head form category comprises a NIOSH Head form Category, wherein NIOSH Head form Categories include small, medium, large, long/narrow, and short/wide.

7. The method of claim 1, further comprising determining, with the one or more processors, a recommended respirator mask manufacturer and/or model for the individual based on the head form category, the numerical data, and the face volume for the individual.

8. The method of claim 1, wherein determining, with the one or more processors, based on the numerical data, the head form category for the individual, comprises:

determining a face length and a face width of the individual; and determining the head form category based on the face length and the face width.

9. The method of claim 1, further comprising determining the facial volume fit criteria for the head form category by:

obtaining, with the one or more processors, at least one fit test three-dimensional (3D) facial image of a plurality of human or human model test subjects in a statistically significant sample size of human or human model test subjects;

converting, with the one or more processors, the fit test facial images of the plurality of human or human model test subjects to numerical fit test data for analysis, the fit test data representative of facial features, facial dimensions, and/or facial locations on the faces of the plurality of human or human model test subjects;

determining, with the one or more processors, based on the numerical fit test data, head form categories for the plurality of human or human model test subjects; and for those human or human model test subjects with the head form category, aggregating, with the one or more processors, the fit test data to determine the facial volume fit criteria for the head form category.

10. The method of claim 1, wherein generating, with the one or more processors, the mask fit pass indication or the mask fit fail indication is performed for two or more different types of respirator masks using the same numerical data.

11. The method of claim 1, wherein the one or more processors are configured such that an algorithm used to determine the face volume for the individual changes based on the head form category.

12. A tangible, non-transitory, machine-readable medium storing instructions that when executed effectuate operations including:

obtaining at least one three-dimensional (3D) facial image of an individual;

converting the at least one three-dimensional (3D) facial image to numerical data for analysis, the numerical data representative of facial features, facial dimensions, and/or facial locations on a face of the individual;

determining, based on the numerical data, a head form category for the individual;

determining, based on the head form category and the numerical data, a face volume for the individual; and generating a mask fit pass indication responsive to the face volume satisfying face volume fit criteria for the head form category; or generating a mask fit fail indication responsive to the face volume not satisfying the face volume fit criteria for the head form category;

wherein the face volume is determined by:

generating a mesh that represents the face of the individual based on the at least one three-dimensional (3D) facial image and/or the numerical data;

identifying a reference location in the mesh corresponding to a specific location on the face of the individual;

cutting the mesh at one or more target distances from the reference location; and determining the face volume for an area of the face defined by the cut mesh.

13. A system comprising one or more processors and memory storing instructions that when executed by the processors cause the processors to effectuate operations comprising:

obtaining at least one three-dimensional (3D) facial image of an individual;

converting the at least one three-dimensional (3D) facial image to numerical data for analysis, the numerical data representative of facial features, facial dimensions, and/or facial locations on a face of the individual;

determining, based on the numerical data, a head form category for the individual;

determining, based on the head form category and the numerical data, a face volume for the individual; and generating a mask fit pass indication responsive to the face volume satisfying face volume fit criteria for the head form category; or generating a mask fit fail indication responsive to the face volume not satisfying the face volume fit criteria for the head form category;

wherein the face volume is determined by:

generating a mesh that represents the face of the individual based on the at least one three-dimensional (3D) facial image and/or the numerical data;

identifying a reference location in the mesh corresponding to a specific location on the face of the individual;

cutting the mesh at one or more target distances from the reference location; and determining the face volume for an area of the face defined by the cut mesh.

14. A method for performing automated personal protective equipment fit testing, the method comprising:

obtaining, with one or more processors, at least one three-dimensional (3D) image of at least a portion of an individual;

converting, with the one or more processors, the at least one three-dimensional (3D) image to numerical data for analysis, the numerical data representative of bodily features, bodily dimensions, and/or bodily locations on a body of the individual;

determining, with the one or more processors, based on the numerical data, a body part category for the portion of the individual;

determining, with the one or more processors, based on the body part category and the numerical data, a body part volume of a body part for the individual; and generating, with the one or more processors, a personal protective equipment pass indication responsive to the body part volume satisfying body part volume fit criteria for the body part category; or generating, with the one or more processors, a personal protective equipment fail indication responsive to the body part volume not satisfying the body part volume fit criteria for the body part category;

wherein the one or more processors are configured to determine the body part volume by:

generating a mesh that represents the body part of the individual based on the at least one three-dimensional (3D) image and/or the numerical data;

identifying a reference location in the mesh corresponding to a specific location on the body part of the individual;

cutting the mesh at one or more target distances from the reference location; and determining the body part volume for an area of the body part defined by the cut mesh.

15. The method of claim 14, wherein the personal protective equipment comprises a respirator mask, industrial head protection equipment, eye and face protection equipment, hand protection equipment, or clothing; and wherein the portion of the individual comprise a corresponding one of a head, a face, a hand, a torso, legs, or feet of the individual.

* * * * *